US010509218B2

(12) United States Patent
Watanabe et al.

(10) Patent No.: US 10,509,218 B2
(45) Date of Patent: Dec. 17, 2019

(54) INFORMATION PROCESSING APPARATUS, IMAGING CONTROL METHOD, PROGRAM, DIGITAL MICROSCOPE SYSTEM, DISPLAY CONTROL APPARATUS, DISPLAY CONTROL METHOD, AND PROGRAM INCLUDING DETECTION OF A FAILURE REQUIRING REIMAGING

(71) Applicant: Sony Corporation, Tokyo (JP)

(72) Inventors: Shinji Watanabe, Tokyo (JP); Nobuhiro Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 14/369,227

(22) PCT Filed: Dec. 7, 2012

(86) PCT No.: PCT/JP2012/081801
§ 371 (c)(1),
(2) Date: Jun. 27, 2014

(87) PCT Pub. No.: WO2013/105373
PCT Pub. Date: Jul. 18, 2013

(65) Prior Publication Data
US 2014/0362204 A1 Dec. 11, 2014

(30) Foreign Application Priority Data

Jan. 11, 2012 (JP) ................. 2012-003214

(51) Int. Cl.
*G02B 21/36* (2006.01)
*G06T 5/00* (2006.01)
(Continued)

(52) U.S. Cl.
CPC ......... *G02B 21/367* (2013.01); *G02B 21/365* (2013.01); *G06T 3/4038* (2013.01);
(Continued)

(58) Field of Classification Search
CPC ................ G02B 21/365; G02B 21/367; G06T 2207/10056; G06T 2207/20221;
(Continued)

(56) References Cited

U.S. PATENT DOCUMENTS 7,424,218 B2 * 9/2008 Baudisch ............... G03B 13/02
348/218.1
2003/0179445 A1 9/2003 Maenle et al.
(Continued)

FOREIGN PATENT DOCUMENTS

EP 1 803 806 A2 7/2007
JP 2004-191959 7/2004
(Continued)

OTHER PUBLICATIONS

PCT/JP2012/081801, Feb. 26, 2013, International Search Report and Written Opinion.
(Continued)

*Primary Examiner* — James T Boylan
(74) *Attorney, Agent, or Firm* — Wolf, Greenfield & Sacks, P.C.

(57) ABSTRACT

Provided is an information processing apparatus including a detection unit configured to detect a failure requiring reimaging relating to an image captured using a digital microscope by evaluating the image, and a generation unit configured to, if the failure was detected by the detection unit, generate setting information for setting an imaging condition for during reimaging.

14 Claims, 15 Drawing Sheets

(51) Int. Cl.
*G06T 5/50* (2006.01)
*G06T 3/40* (2006.01)
*G06T 7/33* (2017.01)

(52) U.S. Cl.
CPC ................ *G06T 5/005* (2013.01); *G06T 5/50* (2013.01); *G06T 7/337* (2017.01); *G06T 2207/10056* (2013.01); *G06T 2207/20221* (2013.01); *G06T 2207/30024* (2013.01); *G06T 2207/30168* (2013.01)

(58) Field of Classification Search
CPC . G06T 2207/30024; G06T 2207/30168; G06T 3/4038; G06T 5/005; G06T 5/50; G06T 7/003
USPC .............................................. 348/79; 382/133
See application file for complete search history.

(56) References Cited

U.S. PATENT DOCUMENTS

| | | |
|---|---|---|
| 2004/0105000 A1 | 6/2004 | Yuri |
| 2005/0099494 A1* | 5/2005 | Deng ................... H04N 1/2112 348/36 |
| 2005/0117144 A1* | 6/2005 | Greenway ................ B01D 9/00 356/30 |
| 2006/0034543 A1* | 2/2006 | Bacus .................. G02B 21/367 382/284 |
| 2006/0078221 A1* | 4/2006 | Duan ...................... G06T 5/005 382/266 |
| 2006/0159367 A1 | 7/2006 | Zeineh et al. |
| 2006/0256397 A1* | 11/2006 | Cui ...................... H04N 1/3876 358/450 |
| 2007/0076943 A1* | 4/2007 | Wienecke ........ G01N 21/95607 382/145 |
| 2007/0146483 A1 | 6/2007 | Ando et al. |
| 2011/0249910 A1* | 10/2011 | Henderson ......... G06K 9/00134 382/278 |

FOREIGN PATENT DOCUMENTS

| | | | |
|---|---|---|---|
| JP | 2006-317406 | 11/2006 | |
| JP | 2006317406 | * 11/2006 | ............. G01N 21/64 |
| JP | 2007-175026 | 7/2007 | |
| JP | 2008-510201 A | 4/2008 | |
| JP | 2009-134100 | 6/2009 | |
| JP | 2010-110556 | 5/2010 | |
| JP | 2010-230495 | 10/2010 | |
| JP | 2013-050667 A | 3/2013 | |
| WO | WO 2010/052929 A1 | 5/2010 | |
| WO | WO 2011/127361 A2 | 10/2011 | |

OTHER PUBLICATIONS

PCT/JP2012/081801, Jul. 24, 2014, International Preliminary Report on Patentability.

* cited by examiner

INFORMATION PROCESSING APPARATUS, IMAGING CONTROL METHOD, PROGRAM, DIGITAL MICROSCOPE SYSTEM, DISPLAY CONTROL APPARATUS, DISPLAY CONTROL METHOD, AND PROGRAM INCLUDING DETECTION OF A FAILURE REQUIRING REIMAGING

CROSS REFERENCE TO RELATED APPLICATIONS

This application claims the benefit under 35 U.S.C. § 371 as a U.S. National Stage Entry of International Application No. PCT/JP2012/081801, filed in the Japanese Patent Office as a Receiving Office on Dec. 7, 2012, which claims priority to Japanese Patent Application Number JP 2012-003214, filed in the Japanese Patent Office on Jan. 11, 2012, each of which is hereby incorporated by reference in its entirety.

TECHNICAL FIELD

The present disclosure relates to an information processing apparatus, an imaging control method, a program, a digital microscope system, a display control apparatus, a display control method, and a program.

BACKGROUND ART

In the past, a digital microscope system has been utilized that captures a digital image of a sample using a microscope. For example, in the field of pathology diagnosis, by utilizing a digital microscope system to capture a digital image of a biological sample, a pathology diagnosis based on the biological sample can be carried out anywhere without retaining information about the biological sample for a long period or transporting the biological sample itself. Patent Literature 1 discloses a technology for generating high-resolution composite image data by capturing partial images of a biological sample and combining those partial images.

CITATION LIST

Patent Literature

Patent Literature 1: JP 2010-230495A

SUMMARY OF INVENTION

Technical Problem

As illustrated in Patent Literature 1, in common digital microscope systems, one sample image is generated from many partial images captured using the microscope. During the processes from image capture until generation, failures often occur. For example, when automatically capturing many samples consecutively, it is rare for all of the image capturing of the sample to be successful. Despite this, in previous technologies relating to digital microscope systems, for example, when an image has been obtained that will cause problems in utilizing a sample image for pathology diagnosis or the like, namely, when there is a failure requiring reimaging, it takes a lot of time and effort from discovery of that failure until reimaging. For example, that failure might only be found by confirming that image on the screen. Consequently, a search is made for the sample to be reimaged, the sample is reinserted, the imaging conditions are reset in order to avoid another failure, and reimaging is carried out. Thus, reimaging takes a lot of time and effort.

Therefore, it is desirable to provide a way to enable reimaging to be performed more quickly and with less effort.

Solution to Problem

According to the present disclosure, there is provided an information processing apparatus including a detection unit configured to detect a failure requiring reimaging relating to an image captured using a digital microscope by evaluating the image, and a generation unit configured to, if the failure was detected by the detection unit, generate setting information for setting an imaging condition for during reimaging.

According to another embodiment of the present disclosure, there is provided an imaging control method including detecting a failure requiring reimaging relating to an image captured using a digital microscope by evaluating the image, and if the failure was detected by the detection unit, generating setting information for setting an imaging condition for during reimaging.

According to another embodiment of the present disclosure, there is provided a program that causes a computer to function as a detection unit configured to detect a failure requiring reimaging relating to an image captured using a digital microscope by evaluating the image, and a generation unit configured to, if the failure was detected by the detection unit, generate setting information for setting an imaging condition for during reimaging.

According to another embodiment of the present disclosure, there is provided a digital microscope system including a digital microscope, and an information processing apparatus including a detection unit configured to detect a failure requiring reimaging relating to an image captured using the digital microscope by evaluating the image, and a generation unit configured to, if the failure is detected by the detection unit, generate setting information for setting an imaging condition for during reimaging.

According to another embodiment of the present disclosure, there is provided a display control apparatus including an acquisition unit configured to acquire setting information for setting an imaging condition for during reimaging that is generated when a failure requiring reimaging relating to an image captured using a digital microscope is generated by evaluating the image, and a display control unit configured to display the setting information acquired by the acquisition unit on a display face.

Advantageous Effects of Invention

According to the information processing apparatus, imaging control method, program, digital microscope system, display control apparatus, display control method, and program according the present disclosure, reimaging can be performed more quickly and with less effort.

DESCRIPTION OF EMBODIMENTS

Figure 1:
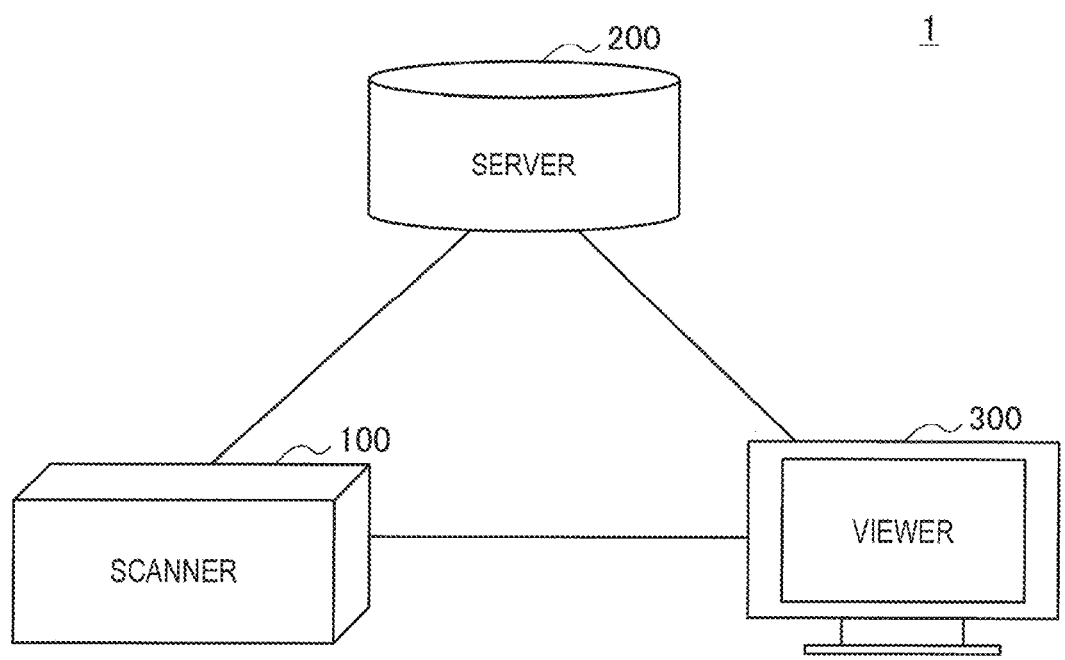
FIG. 1 is an explanatory diagram illustrating an example of a schematic configuration of a digital microscope system according to an embodiment of the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

It is noted that the description will be made in the following order.
1. Schematic configuration of a digital microscope system
2. First embodiment
2.1 Scanner configuration
2.2 Server configuration
2.3 Viewer configuration
2.4 Processing flow
3. Second embodiment
3.1 Scanner configuration
3.2 Server configuration
3.3 Processing flow
4. Summary

1. Schematic Configuration of a Digital Microscope System

First, a schematic configuration of a digital microscope system 1 according to an embodiment of the present disclosure will now be described with reference to FIG. 1. FIG. 1 is an explanatory diagram illustrating an example of a schematic configuration of the digital microscope system according to an embodiment of the present disclosure. As illustrated in FIG. 1, the digital microscope system 1 includes a scanner 100, a server 200, and a viewer 300.

The scanner 100 is an information processing apparatus that has a digital microscope, or is connected to a digital microscope. The scanner 100 captures an image of a sample using the digital microscope. For example, a prepared slide on which the sample is fixed is inserted in the digital microscope. When the prepared slide has been inserted in the digital microscope, the scanner 100 determines an imaging condition and sets the determined imaging condition in the digital microscope. Further, the scanner 100 captures an image of the sample on the prepared slide using the digital microscope. More specifically, the scanner 100 determines an imaging area of the sample as an imaging condition, and sets the determined imaging area in the digital microscope. Then, the scanner 100 divides the imaging area into a plurality of individual areas, determines an imaging sequence of this plurality of individual areas, and sets the determined imaging sequence in the digital microscope. Next, the scanner 100 makes the digital microscope capture an image of the sample at each individual area. Then, the scanner 100 generates a composite image by combining the images of the plurality of captured individual areas as partial images. Thus, one sample image, namely, a composite image, is generated by the scanner 100.

The server 200 is an information processing apparatus that manages a sample image generated by the scanner 100. For example, the server 200 associates and stores in a database the composite image generated by the scanner 100 with identification information about the sample.

The viewer 300 is an example of a display control apparatus. For example, the viewer 300 displays on a display face a composite image of a sample generated by the scanner 100 or stored by the server 200. Further, for example, the viewer 300 provides a user interface for enabling the imaging conditions of the scanner 100 to be designated based on a user operation. Namely, the user can designate the imaging conditions of the scanner 100 via an operation made on the viewer 300.

In the embodiments according to the present disclosure, reimaging can be carried out in the digital microscope system 1 with less time and effort. The specific subject matter of <2. First embodiment> and <3. Second embodiment> will now be described below.

2. First Embodiment

First, a first embodiment according to the present embodiment will be described. According to the first embodiment of the present disclosure, a failure requiring reimaging is automatically detected by the scanner 100, and reimaging is carried out based on that failure.

<2.1 Scanner Configuration>

Figure 2:
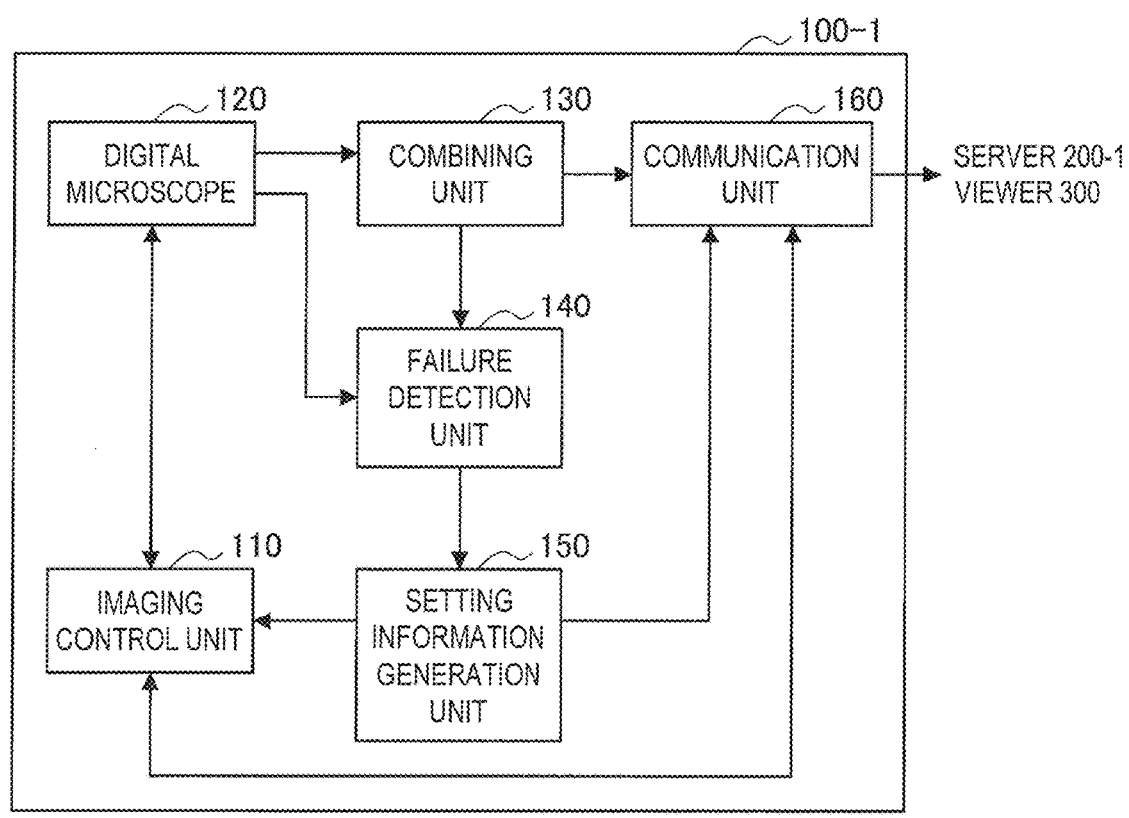
FIG. 2 is a block diagram illustrating an example of a configuration of a scanner according to a first embodiment.

An example of the configuration of a scanner 100-1 according to the first embodiment will now be described with reference to FIGS. 2 to 6. FIG. 2 is a block diagram illustrating an example of the configuration of the scanner 100-1 according to the first embodiment. As illustrated in FIG. 2, the scanner 100-1 includes an imaging control unit 110, a digital microscope 120, a combining unit 130, a failure detection unit 140, a setting information generation unit 150, and a communication unit 160.

(Imaging Control Unit 110)

The imaging control unit 110 controls imaging that uses the digital microscope 120. For example, the imaging control unit 110 sets in the digital microscope 120 imaging conditions designated by the user or that are automatically determined, and makes the digital microscope 120 capture an image of the sample based on those imaging conditions. For example, as imaging conditions for the entire sample, the imaging control unit 110 sets, an imaging area, an imaging sequence, illumination brightness, a white balance coefficient and the like. Further, as an imaging condition for each individual area, for example, the imaging control unit 110 sets a focus position.

Further, when the setting information generation unit 150 has generated the setting information for setting the imaging conditions for during reimaging, the imaging control unit 110 resets at least some of the above-described imaging conditions in the digital microscope 120. Then, the imaging control unit 110 makes the digital microscope 120 recapture an image of the sample based on the reset imaging conditions.

The imaging control unit 110 outputs information about the set or reset imaging conditions (hereinafter referred to as "imaging conditions information") to the communication unit 160.

(Digital Microscope 120)

The digital microscope 120 captures an image based on the imaging conditions set by the imaging control unit 110. For example, the digital microscope 120 captures images showing each individual area in the set imaging area (hereinafter, referred to as "individual images"). This point will be described in more detail below with reference to FIG. 3.

Figure 3:
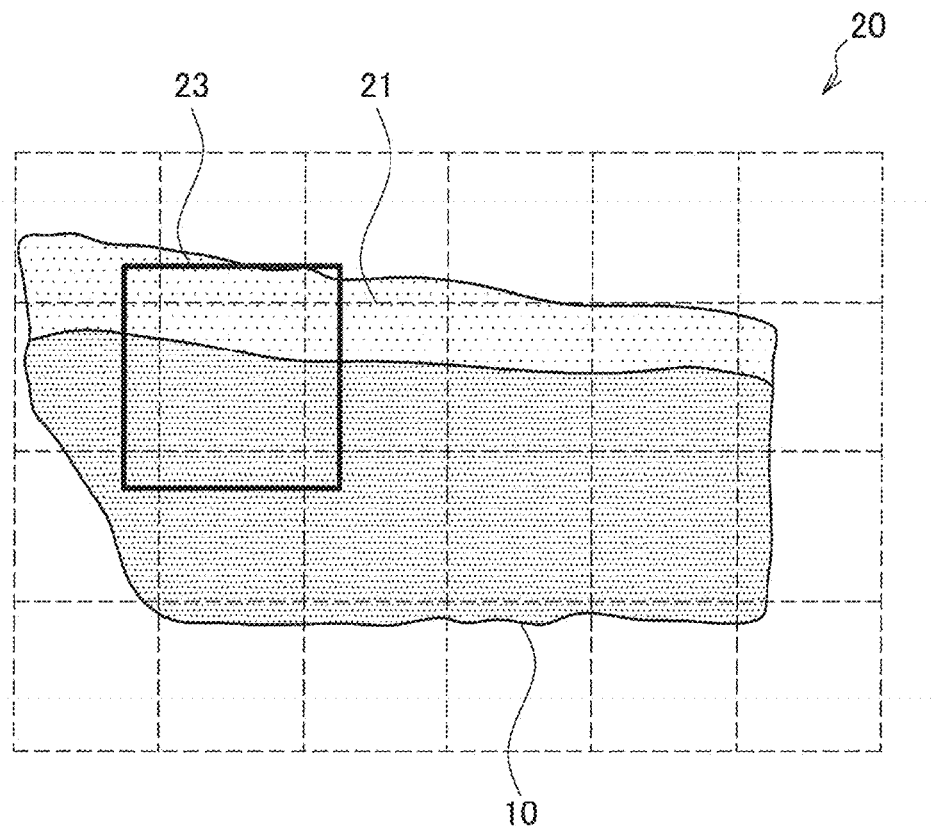
FIG. 3 is an explanatory diagram illustrating an example of imaging by a digital microscope.

FIG. 3 is an explanatory diagram illustrating an example of imaging by the digital microscope 120. As illustrated in FIG. 3, to capture an image of a biological sample 10, an imaging area 20 that includes the whole of the biological sample 10 is set. This imaging area 20 is divided into a plurality of individual areas 21. The imaging sequence of the individual areas 21 can be set in an arbitrary sequence such as, for example, in a spiral-shaped sequence from the center toward the external side of the biological sample 10, or in a zigzag sequence that alternately moves through each column from top to bottom or from bottom to top. Based on the thus-set imaging sequence, the digital microscope 120 captures an individual image showing each of the individual areas 21. Here, the digital microscope 120 captures an expanded area 23 that includes an individual area 21 as an individual image so that adjacent individual images can be subsequently combined.

The digital microscope 120 outputs the captured individual image to the combining unit 130 and the failure detection unit 140.

It is noted that the digital microscope 120 includes, for example, an optical system, an image sensor, an image processing circuit, and a drive circuit. The optical system can include an objective lens, for example. The image sensor is, for example, a CMOS (complementary metal oxide semiconductor) image sensor or a CCD (charge coupled device) image sensor. The image processing circuit performs development processing, such as demosaicing processing and white balance correction. The drive circuit moves the relative positions of the objective lens and the sample each time an individual image is captured based on the set imaging area and imaging sequence.

(Combining Unit 130)

The combining unit 130 generates a composite image by combining individual images captured by the digital microscope 120. This point will be described below in more detail with reference to FIG. 4.

Figure 4:
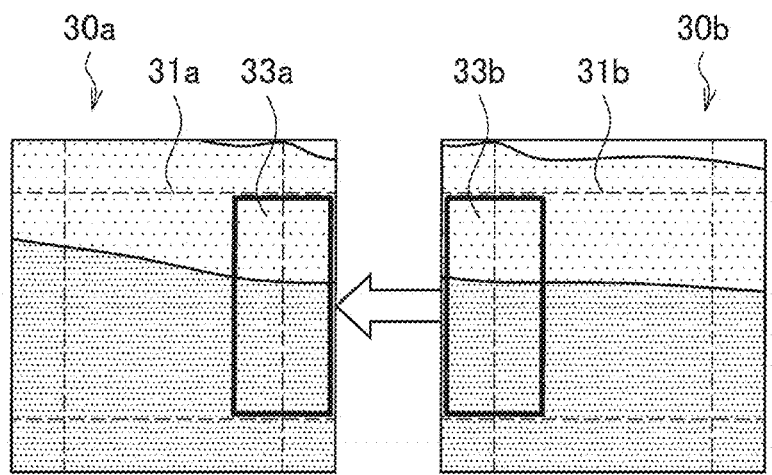
FIG. 4 is an explanatory diagram illustrating an example of combining images.

FIG. 4 is an explanatory diagram illustrating an example of combining images. FIG. 4 shows individual images 30a and 30b captured at adjacent individual areas 21. As already described with reference to FIG. 3, the individual images 30 are images of an area 23 that include an individual area 21. Therefore, the individual images 30 have a portion 31 corresponding to the individual areas 21, and a portion 33 (hereinafter referred to as "overlapping portion") where the images overlap. The combining unit 130 combines the individual image 30a and the individual image 30b by appropriately superimposing an overlapping portion 33b on an overlapping portion 33a. Here, the combining unit 130 superimposes the overlapping portion 33b on the overlapping portion 33a using a luminance value of the overlapping portion 33a and a luminance value of the overlapping portion 33b. As an example, for example, the combining unit 130 superimposes the overlapping portion 33b on the overlapping portion 33a, calculates a difference in the luminance value between each pixel of the overlapping portion 33a and the corresponding pixel of the overlapping portion 33b, and sums the absolute values of these differences across the plurality of pixels. The combining unit 130 calculates such a total value of the absolute values of the difference in luminance values for each position while changing the position of the overlapping portion 33b. Further, the combining unit 130 determines the position of the overlapping portion 33b where the minimum total value is calculated as the optimum position for the overlapping portion 33b during combining. The combining unit 130 sequentially combines the individual images of adjacent individual areas 21 in this way to ultimately generate one composite image of the entire sample.

The combining unit 130 outputs the generated composite image to the communication unit 160. Further, the combining unit 130 outputs the above-described minimum total value regarding the combining of the respective individual images to the failure detection unit 140. It is noted that the combining unit 130 may also output the generated composite image to the failure detection unit 140.

(Failure Detection Unit 140)

The failure detection unit 140 detects a failure requiring reimaging relating to an image captured using the digital microscope 120 by evaluating that image. The expression "evaluating an image" includes evaluating each of the individual images and evaluating a composite image formed from the individual images. Failure detection by the failure detection unit 140 will be described below using first to fifth examples of specific failure detection. It is noted that in the first and second examples of failure detection, the failure detection unit 140 detects a failure relating to a composite image generated by combining a plurality of individual images as the above-described failure.

In the first example, the failure detection unit 140 detects an imaging omission of an area that should be included in a composite image as a failure relating to a composite image. This point will be described in more detail with reference to FIGS. 5A and 5B.

Figure 5A:
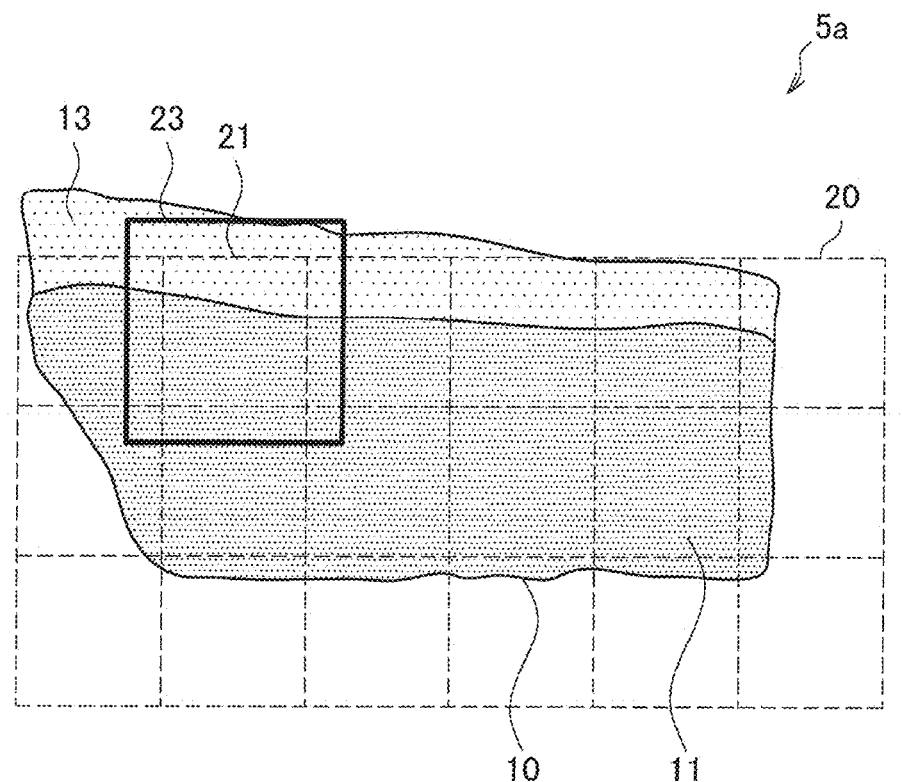
FIG. 5A is an explanatory diagram illustrating an example of an imaging omission.

FIG. 5A is an explanatory diagram illustrating an example of an imaging omission. Similar to FIG. 3A, FIG. 5A illustrates a biological sample 10, an imaging area 20, a plurality of individual areas 21, and an area 23 that is an imaging area of an individual image and includes an individual area 21. Here, although the imaging area 20 includes the entire dark-colored portion 11 of the biological sample 10, the imaging area 20 does not include the light-colored portion 13 of the biological sample 10. Namely, a part of the sample 10 is not captured even though it is an area that should be included in the composite image. For example, when determining an imaging area by detecting the edges of a biological sample using an image of the whole of the biological sample, this light-colored portion 13 may thus be omitted from the imaging area. Thus, if there is an imaging omission, it can become difficult to correctly utilize the sample (e.g., in pathology diagnosis).

Accordingly, for example, the failure detection unit 140 detects an imaging omission of an area that should be included in a composite image by evaluating a direction in which texture is present in the image. More specifically, for example, the failure detection unit 140 evaluates a direction in which texture is present in an individual image of an area positioned at a peripheral portion of the imaging area 20, namely, in an individual image forming the peripheral portion of the composite image. This point will now be described in more detail with reference to FIG. 5B.

Figure 5B:
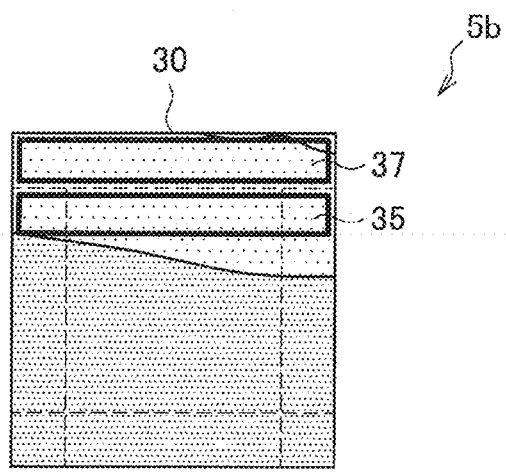
FIG. 5B is an explanatory diagram illustrating an example of detection of an imaging omission.

FIG. 5B is an explanatory diagram illustrating an example of detection of an imaging omission. FIG. 5B illustrates a single individual image 30 that forms a peripheral portion 35 of a composite image. Since the individual image 30 is an image of the area 23 that includes an individual area 21, the individual image 30 includes a protruding portion 37 that protrudes from the composite image. In other words, this protruding portion 37 shows an area on the external side of the imaging area 20. Consequently, if some type of texture is present in the protruding portion 37 of the individual image 30, it can be said that there is a sample that should also be captured in the direction of the protruding portion 37 that is omitted from the imaging area 20. Therefore, the failure detection unit 140 can detect whether there is an imaging omission by determining whether texture is present in that protruding portion 37 of the individual image 30 as an evaluation of the direction in which texture is present. It is noted that the failure detection unit 140 can detect whether texture is present in the protruding portion 37 by, for example, detecting an edge in the protruding portion 37 with an edge detection filter, calculating the amount of the detected edge, and determining whether that edge amount exceeds a predetermined threshold.

Further, the failure detection unit 140 may detect an imaging omission using the composite image rather than an individual image. In this case, the failure detection unit 140 detects the above-described imaging omission by evaluating a direction in which texture is present in an individual image included in the composite image. Since the protruding portion 37 of the individual image 30 is not included in the composite image, the failure detection unit 140 determines whether texture is present in the peripheral portion 35 instead of the protruding portion 37 of the individual image 30, for example. If some kind of texture is present in the peripheral portion 35, it can be presumed that there is a high likelihood that there is also a sample that should be captured on the external side of the imaging area 20 in the direction corresponding to the peripheral portion 35. Therefore, the failure detection unit 140 can detect whether there is an imaging omission by determining whether texture is present in the peripheral portion 35 as an evaluation of a direction in which texture is present. It is noted that the failure detection unit 140 may determine the edge direction of the peripheral portion 35 instead of, or in combination with, determining whether texture is present in the peripheral portion 35, for example. Namely, since it can be presumed that if an edge in the external direction of the composite image is present (in FIG. 5B, an edge in the vertical direction), an edge is also extending in the protruding portion 37, it can be presumed that there is a high likelihood that there is also a sample that should be captured on the external side of the imaging area 20 in the direction corresponding to the peripheral portion 35.

Thus, the failure detection unit 140 detects an imaging omission of an area that should be included in the composite image by evaluating a direction in which texture is present in an individual image, for example.

In a second example, the failure detection unit 140 detects a combining failure when generating the above-described composite image as a failure relating to a composite image. As described with reference to FIG. 4, although a composite image is generated by combining captured individual images, there are cases in which the individual images are not appropriately combined. Consequently, an unnatural shift can occur across the whole of the composite image or in a part of the composite image, which can prevent the sample from being correctly confirmed.

Accordingly, as an example, the failure detection unit 140 detects the above-described combining failure by evaluating the luminance value of an overlapping portion when the composite image is generated. As already described with reference to FIG. 4, when combining an individual image 30*a* and an individual image 30*b*, the combining unit 130 calculates a difference in luminance values between each pixel of the overlapping portion 33*a* and the corresponding pixel of the overlapping portion 33*b*, and sums the absolute values of these differences across the plurality of pixels. Further, the combining unit 130 determines the position of the overlapping portion 33*b* where the minimum total value is calculated as the optimum position for the overlapping portion 33*b* during combining. Consequently, the above-described minimum total value can be said to be a value ultimately indicating the appropriateness level of the combining. Namely, if the minimum total value is small, the combining can be said to be successful, while if the minimum total value is large, the combining can be said to be a failure. Therefore, the failure detection unit 140 can detect a combining failure by determining whether the minimum total value exceeds a predetermined threshold. It is noted that the failure detection unit 140 acquires the minimum total value from the combining unit 130.

Further, as another example, the failure detection unit 140 may also detect the above-described combining failure by evaluating an edge appearing in a predetermined direction in the composite image. This point will be described in more detail below with reference to FIG. 6.

Figure 6:
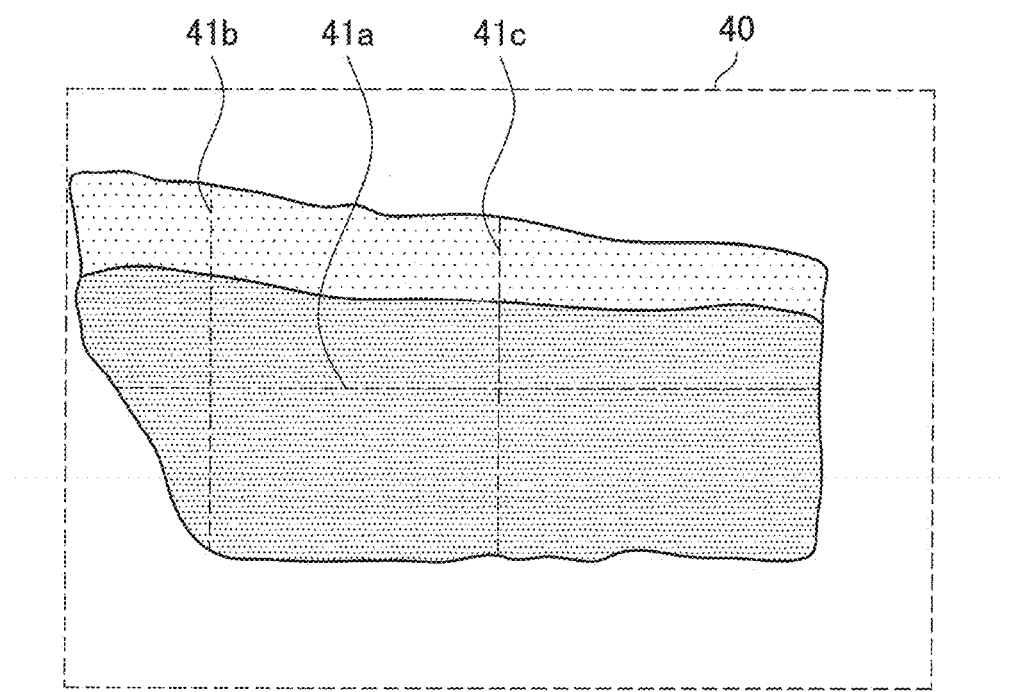
FIG. 6 is an explanatory diagram illustrating an example of edges that appear in a composite image during a combining failure.

FIG. 6 is an explanatory diagram illustrating an example of edges that appear in a composite image during combining failure. In FIG. 6, a composite image 40 is illustrated. If a failure occurs in combining when generating the composite image 40, since the individual images are offset from each other at the combining boundary, an edge appears at the combining boundary. For example, an edge 41*a* in the horizontal direction and an edge 41*b* in the vertical direction appear. Consequently, for example, the failure detection unit 140 detects edges in predetermined directions (e.g., the horizontal direction and the vertical direction) that appear in the composite image, and evaluates the length or the strength of the detected edges. For example, if the length of a detected edge is greater than a predetermined ratio of the length of one side of an individual area 21, that edge can be presumed to be an edge generated as a result of combining failure. Further, if a detected edge has a strength that is greater than what could be expected for a particular edge of the sample, then that edge can also be presumed to be an edge generated as a result of combining failure. In such a case, the failure detection unit 140 detects the above-described combining failure.

Thus, the failure detection unit 140 detects a combining failure by evaluating, for example, the luminance value of an overlapping portion or an edge that appears in a predetermined direction in the composite image.

In a third example, the failure detection unit 140 detects a flaw in the focus position as a failure requiring reimaging that is related to an individual image or a composite image. When the digital microscope 120 is capturing an individual image, the imaging control unit 110 sets a focus position in the digital microscope 120. However, if the focus position setting is incorrect, a blurry image may be captured. Consequently, it can be difficult to correctly confirm the sample.

Accordingly, as an example, the failure detection unit 140 detects a flaw in the focus position by evaluating the contrast of the individual image. Blurry images have a lower contrast. Therefore, the failure detection unit 140 can detect a flaw in the focus position by calculating the contrast of an individual image, and determining whether the calculated contrast exceeds a predetermined threshold. It is noted that any method may be used to as the contrast calculation method. As an example, the failure detection unit 140 calculates the difference in luminance values among each of four adjacent pixels, and sums the absolute values of those differences. In addition, the failure detection unit 140 may also sum the total value calculated for each pixel for the whole individual image. For example, the thus-calculated total value may be used as the contrast of the individual image. In this way, the failure detection unit 140 detects a flaw in the focus position.

In a fourth example, the failure detection unit 140 detects a flaw in the white balance as a failure requiring reimaging that is related to an individual image or a composite image. Although white balance correction is performed in the digital microscope 120 during the development processing of the individual image, a mistaken white balance can cause the color of the individual image to be developed as a color different to the actual sample. Consequently, this can make it difficult to correctly confirm the color of the sample.

Accordingly, as an example, the digital microscope 120 captures an image of an area in which the sample is not present (i.e., nothing is shown). Then, the failure detection unit 140 compares color information about that image with color information prepared in advance as a template. If the difference between these is greater than a predetermined threshold, the failure detection unit 140 detects a flaw in the white balance. In this way, the failure detection unit 140 detects a flaw in the white balance.

In a fifth example, the failure detection unit 140 detects a flaw in the brightness as a failure requiring reimaging that is related to an individual image or a composite image. Although the illumination brightness is adjusted during imaging in the digital microscope 120, a mistaken brightness can cause individual images that are too bright or are too dark to be captured. Consequently, this can make it difficult to correctly confirm the sample.

Accordingly, as an example, similar to a flaw in the white balance, the digital microscope 120 captures an image of an area in which the sample is not present (i.e., nothing is shown). Then, the failure detection unit 140 compares luminance information about that image with luminance information prepared in advance as a template. If the difference between these is greater than a predetermined threshold, the failure detection unit 140 detects a flaw in the brightness. In this way, the failure detection unit 140 detects a flaw in the brightness.

In the above, failure detection by the failure detection unit 140 was described using the first to fifth examples of specific failure detection. Based on such failure detection, a failure requiring reimaging can be automatically detected without making the user confirm the image on a screen.

In the first embodiment, every time each of a plurality of individual images is captured, the failure detection unit 140 evaluates each image in order to detect a failure requiring reimaging. Based on such evaluation, a failure can be detected at the point when the individual images are captured, which enables reimaging to be immediately performed after the failure has been detected. Namely, in order to carry out reimaging, it is not necessary to reinsert the sample into the digital microscope 120 or change the settings for items that do not need to be reset. Therefore, in this case, the work required to perform reimaging is almost eliminated, and the time taken for reimaging is substantially reduced.

The failure detection unit 140 outputs information relating to the detected failure to the setting information generation unit 150.

(Setting Information Generation Unit 150)

When a failure is detected by the failure detection unit 140, the setting information generation unit 150 generates setting information for setting the imaging conditions for during reimaging. Generation of the setting information by the setting information generation unit 150 will be described below using the above-described first to fifth examples of failure detection.

First, the generation of setting information for when an imaging omission is detected will be described. When the above-described imaging omission is detected by the failure detection unit 140, for example, the setting information generation unit 150 generates imaging area information for resetting the imaging area so as to include an additional area to be newly captured. This imaging area information is one piece of setting information. More specifically, as described with reference to FIGS. 5A and 5B, when evaluating the directions in which texture is present in an individual image, the failure detection unit 140 knows the individual area 21 (or individual image 30) and the direction (e.g., left, right, up, down) that the imaging omission is in. Therefore, the setting information generation unit 150 acquires from the failure detection unit 140 a combination of the individual area 21 coordinates and imaging omission direction as information relating to that imaging omission, and generates information including that combination as area information. Based on such imaging area information, the imaging control unit 110 can reset the imaging area so as to include the imaging omission area. Consequently, the same imaging omission can be avoided during reimaging.

It is noted that the imaging area information may include information simply instructing that the imaging area be expanded. In this case, the imaging control unit 110 changes a parameter for determining the imaging area so that the imaging area is wider. As an example, the imaging control unit 110 determines the imaging area by detecting the edges of the sample that appear in an image of the whole sample. In this case, the imaging control unit 110 decreases the threshold in the edge detection. Consequently, since weaker edges are also detected, a wider imaging area is determined and reset in the digital microscope 120. Further, as another example, the imaging control unit 110 divides an image of the whole sample into blocks, calculates the variance in the luminance value of each block, and determines a block area that has a variance exceeding a threshold as the imaging area. In this case, the imaging control unit 110 decreases this threshold for comparing with the variance. Consequently, since more block areas are determined as the imaging area, a wider imaging area is reset in the digital microscope 120.

In addition, for example, if the imaging area is reset, the setting information generation unit 150 also generates imaging sequence information for resetting the imaging sequence of the individual images. This imaging sequence information is one piece of setting information. This imaging sequence information includes, for example, information instructing that the imaging sequence be newly set. Generally, the individual images of adjacent individual areas 21 are captured consecutively. By thus consecutively capturing adjacent individual images and combining them in sequence, the likelihood of a combining failure is decreased. On the other hand, in reimaging, if the individual images are first captured in the original imaging sequence, and an individual image of an expanded area is additionally captured, the individual image of the expanded area is not captured in sequence with the individual images of the original imaging area. Consequently, the likelihood of a combining failure is increased. Therefore, when resetting the imaging area, a combining failure can be avoided during reimaging by additionally generating imaging sequence information and resetting the imaging sequence as well.

Second, the generation of setting information when a combining failure is detected during generation of the composite image will be described. When the above-described combining failure is detected by the failure detection unit 140, the setting information generation unit 150 generates imaging sequence information for resetting the imaging sequence of the individual images. This imaging sequence information is information that instructs an imaging sequence to be set that is different from the imaging sequence when the combining failure was detected. This expression "different imaging sequence" may be an imaging sequence in which the start position of imaging is different, or an imaging sequence in which the scan pattern (a spiral-shaped sequence, a zigzag sequence etc.) is different. The occurrence of a combining failure is largely dependent on what type of imaging sequence is set. As described with reference to FIG. 4, the combining of the individual images 30 is performed using a luminance value of an overlapping portion 33. For example, when imaging from an individual image 30 in which there is hardly any change in luminance among the pixels in the overlapping portion 33, a deviation occurs in combining, so that the likelihood of a combining failure in the imaging area increases. Thus, the occurrence of a combining failure depends on the imaging sequence. Therefore, if a combining failure has occurred, by performing reimaging in a different imaging sequence, the likelihood that a combining failure will occur is decreased. It is noted that the imaging sequence information may include information that indicates the imaging sequence per se when the combining failure was detected.

Third, the generation of setting information when a flaw in the focus position is detected will be described. When a flaw in the focus position is detected, the setting information generation unit 150 generates focus position information for resetting the focus position. This focus position information is one piece of setting information. This focus position information is, for example, information including the coordinates and the set focus position of an individual area corresponding to the individual image for which a flow in the focus position was detected. Based on such focus position information, the imaging control unit 110 can change the focus position especially for an individual area having a flaw in its focus position. Consequently, the same focus position flaw can be avoided during reimaging.

It is noted that, when determining the focus position at each individual area in the imaging area, the imaging control unit 110 determines the focus position for another individual area by, for example, independently measuring the focus position at several individual areas, and performing interpolation using the measured focus positions. In this case, based on this focus position, the imaging control unit 110 may change the individual areas where the focus positions are independently measured, or may change the interpolation method. In this case, the focus position information may include information simply instructing that the focus position be changed.

Fourth, the generation of setting information when a flaw in the white balance is detected will be described. When a flaw in the white balance is detected, the setting information generation unit 150 generates white balance information for resetting the white balance. This white balance information is one piece of setting information. This white balance information includes, for example, color information about an image of an area in which the sample is not present (i.e., color information compared with template color information) for when a flaw in white balance was detected. Based on such white balance information, the imaging control unit 110 can adjust the white balance (e.g., RGB coefficient in white balance correction) to an appropriate value. Consequently, the same white balance flaw can be avoided during reimaging. It is noted that the setting information generation unit 150 may also determine how the RGB coefficient should be changed (e.g., multiply R by a factor of 0.8, etc.) and generate white balance information including such information from the color information about an image in which the sample is not present and the color information prepared in advance as a template.

Fifth, the generation of setting information when a flaw in the brightness is detected will be described. When a flaw in the brightness is detected, the setting information generation unit 150 generates brightness information for resetting the illumination brightness. This brightness information is one piece of setting information. This brightness information includes, for example, luminance information about an image of an area in which the sample is not present (i.e., luminance information compared with template luminance information) for when a flaw in brightness was detected. Based on such brightness information, the imaging control unit 110 can adjust the illumination brightness to an appropriate value. Consequently, the same brightness flaw can be avoided during reimaging. It is noted that the setting information generation unit 150 may also determine how the illumination brightness should be changed (e.g., multiply the brightness R by a factor of 1.2, etc.) and generate brightness information including such information from the brightness information about an image in which the sample is not present and the brightness information prepared in advance as a template.

In the above, the generation of setting information by the setting information generation unit 150 was described using the first to fifth examples of specific failure detection. Based on such setting information, the scanner 100 can automatically set the imaging conditions for reimaging without the user having to individually reconsider the imaging conditions for avoiding another failure.

The setting information generation unit 150 outputs the generated setting information to the imaging control unit 110 and the communication unit 160.

(Imaging Control Unit 110 (Cont . . . ))

Thus, a failure requiring reimaging is detected by the combining unit 130, and setting information based on this failure is generated by the setting information generation unit 150. On the other hand, for example, the imaging control unit 110 determines whether to make the digital microscope 120 recapture each of the individual images or to recapture the entirety of the plurality of individual images based on the type of the above-described failure that is detected by the failure detection unit 140. Namely, it is determined whether to perform partial reimaging or entire reimaging. For example, the imaging control unit 110 performs a determination as illustrated below.

TABLE 1

| Failure Type | Partial Reimaging | Entire Reimaging |
| --- | --- | --- |
| Imaging omission | o<br>(time shortening ><br>failure avoidance) | o<br>(failure avoidance ><br>time shortening) |
| Combining failure | x | o |
| Flaw in focus position | o<br>(time shortening ><br>failure avoidance) | o<br>(failure avoidance ><br>time shortening) |
| Flaw in white balance | x | o |
| Flaw in brightness | x | o |

Namely, if the type of failure is an imaging omission or a flaw in the focus position, for example, the imaging control unit 110 may determine to perform partial reimaging if giving priority to shortening the time taken for reimaging. If giving priority to avoiding a combining failure, the imaging control unit 110 may determine to perform entire reimaging. Whether priority is given to shortening the time taken for reimaging or to avoiding a combining failure is set in the imaging control unit 110 in advance.

Further, if the type of failure is a combining failure, a flaw in the white balance, or a flaw in the brightness, for example, the imaging control unit 110 determines that entire reimaging is to be performed. Since a combining failure often affects the whole composite image rather than just a part of the composite image, it is desirable to perform entire reimaging. In addition, since white balance and brightness are normally set to the same setting for all of the plurality of individual images rather than differently for each individual image, white balance and brightness similarly effect the plurality of individual images. Therefore, it is desirable to perform entire reimaging.

Thus, by determining the reimaging range based on the type of failure, reimaging can be performed for the necessary range. Namely, reimaging can be performed more efficiently while avoiding another failure in the reimaging.

(Communication Unit 160)

The communication unit 160 communicates with a server 200-1 and the viewer 300. For example, the communication unit 160 transmits the composite image from the combining unit 130 to the server 200-1 and the viewer 300. Further, the communication unit 160 transmits imaging conditions information from the imaging control unit 110 to the server 200-1 and the viewer 300. In addition, the communication unit 160 transmits setting information from the setting information generation unit 150 to the viewer 300.

Further, if the imaging conditions are to be determined or changed by the server 200-1 or the viewer 300, the communication unit 160 may also receive the imaging conditions information from the server 200-1 or the viewer 300. Similarly, if the setting information is to be generated or changed by the server 200-1 or the viewer 300, the communication unit 160 may also receive the setting information from the server 200-1 or the viewer 300. The communication unit 160 can output these received pieces of information to the imaging control unit 110.

<2.2 Server Configuration>

Figure 7:
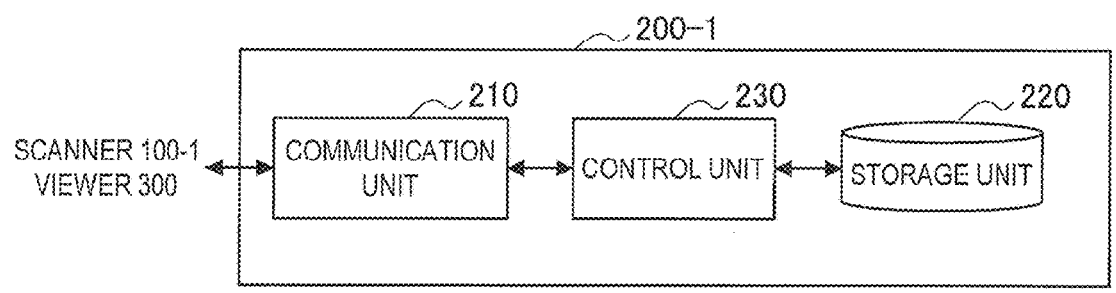
FIG. 7 is a block diagram illustrating an example of a configuration of a server according to a first embodiment.

An example of the configuration of the server 200-1 according to the first embodiment will now be described with reference to FIG. 7. FIG. 7 is a block diagram illustrating an example of the configuration of the server 200-1 according to the first embodiment. As illustrated in FIG. 7, the server 200-1 includes a communication unit 210, a storage unit 220, and a control unit 230.

(Communication Unit 210)

The communication unit 210 communicates with a scanner 100-1 and the viewer 300. For example, the communication unit 210 receives a composite image and imaging conditions information from the scanner 100-1. Further, the communication unit 210 transmits a composite image and imaging conditions information stored in the storage unit 220 to the viewer 300.

(Storage Unit 220)

The storage unit 220 stores a composite image and imaging conditions information managed by the server 200-1. For example, the storage unit 220 may also be configured as a database that associates identification information about each sample, and stores a composite image of that sample and imaging conditions information about when that composite image was generated.

(Control Unit 230)

The control unit 230 controls the whole server 200-1. For example, when a composite image and imaging conditions information are received by the communication unit 210 from the scanner 100-1, the control unit 230 stores the received composite image and imaging conditions information in the storage unit 220. Further, the control unit 230 may also transmit the composite image to be presented to the user and the imaging conditions information either automatically or based on an instruction from the user.

<2.3 Viewer Configuration>

Figure 8:
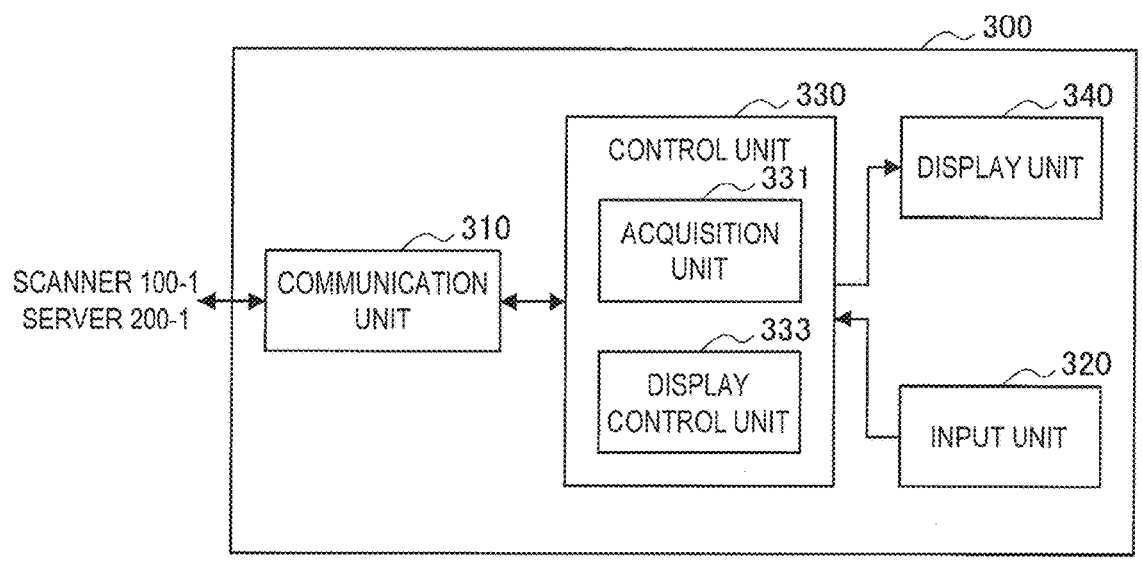
FIG. 8 is a block diagram illustrating an example of a configuration of a viewer according to a first embodiment.

An example of the configuration of the viewer 300 according to the first embodiment will now be described with reference to FIG. 8. FIG. 8 is a block diagram illustrating an example of the configuration of the viewer 300 according to the first embodiment. As illustrated in FIG. 8, the viewer 300 includes a communication unit 310, an input unit 320, a control unit 330, and a display unit 340.

(Communication Unit 310)

The communication unit 310 communicates with a scanner 100-1 and the server 200-1. For example, the communication unit 310 receives a composite image to be presented to the user from the scanner 100-1 or the server 200-1. Along with the composite image, the communication unit 310 can also receive imaging conditions information or setting information associated with that composite image.

Further, if the imaging conditions have been designated or the setting information has been edited by the user via a below-described user interface, the communication unit 310 transmits the imaging conditions information indicating the designated imaging conditions or the edited setting information to the scanner 100-1.

(Input Unit 320)

The input unit 320 detects a user operation. This input unit 320 may include one or more input devices, such as a touch panel, a keyboard, buttons, a pointing device and the like.

(Control Unit 330)

The control unit 330 controls the whole viewer 300. The control unit 330 includes, for example, an acquisition unit 331 and a display control unit 333.

(Acquisition Unit 331)

The acquisition unit 331 acquires a composite image to be presented to the user and the imaging conditions information when that composite image was generated via the communication unit 310. The acquisition unit 331 acquires the composite image and the imaging conditions information based on an instruction from the user, or each time a composite image is generated by the scanner 100-1, for example.

Further, the acquisition unit 331 acquires imaging conditions information indicating the imaging conditions of the scanner 100-1 at the current point via the communication unit 310. The acquisition unit 331 acquires this imaging conditions information based on, for example, an instruction from the user.

In addition, the acquisition unit 331 may acquire setting information via the communication unit 310 under predetermined conditions. For example, if an instruction to present the setting information to the user was issued by the user before imaging started, or if setting information that should be presented to the user has been generated, the acquisition unit 331 may acquire the setting information.

(Display Control Unit 333)

The display control unit 333 displays a composite image on a display face of the display unit 340. For example, the display control unit 333 displays a composite image on the above-described display face based on an instruction from the user or each time a composite image is generated. Further, if a failure requiring reimaging is found when the user is viewing the composite image, the display control unit 333 displays, for example, the imaging conditions information when that composite image was generated on the display face of the display unit 340 so that the user can reconsider the imaging conditions.

Further, to let the user freely designate the imaging conditions, the display control unit 333 provides, for example, a user interface for enabling the imaging conditions of the scanner 100-1 to be designated by a user operation. For example, the display control unit 333 presents the imaging conditions of the scanner 100-1 at the current point to the user based on an instruction from the user. Further, if the user designates the imaging conditions by a user operation on the input unit 320, the display control unit 333 transmits imaging conditions information indicating the designated imaging conditions to the scanner 100-1 via the communication unit 310.

In addition, the display control unit 333 may also display acquired setting information on the display face of the display unit 340. In the present embodiment, a failure requiring reimaging is automatically detected and reimaging is also automatically carried out by the scanner 100-1. However, if an instruction was issued by the user before imaging started to present setting information to the user, or if setting information that should be presented to the user has been generated, setting information for reimaging may also be displayed.

As an example, the display control unit 333 may present setting information to the user before reimaging is executed. Further, the display control unit 333 may also enable the setting information to be edited by the user before reimaging is executed. Enabling the setting information to be edited in this way allows the user to edit the setting information and perform reimaging in a more appropriate manner if it is determined that the setting information is not suitable.

(Display Unit 340)

The display unit 340 is a display that has a display face. The display unit 340 displays, for example, a composite image, imaging conditions information, setting information or the like, on the display face under the control of the control unit 330.

<2.4 Processing Flow>

Next, an example of the imaging control processing according to the first embodiment will be described with reference to FIGS. 9 to 11.

(Imaging Control Processing)

Figure 9:
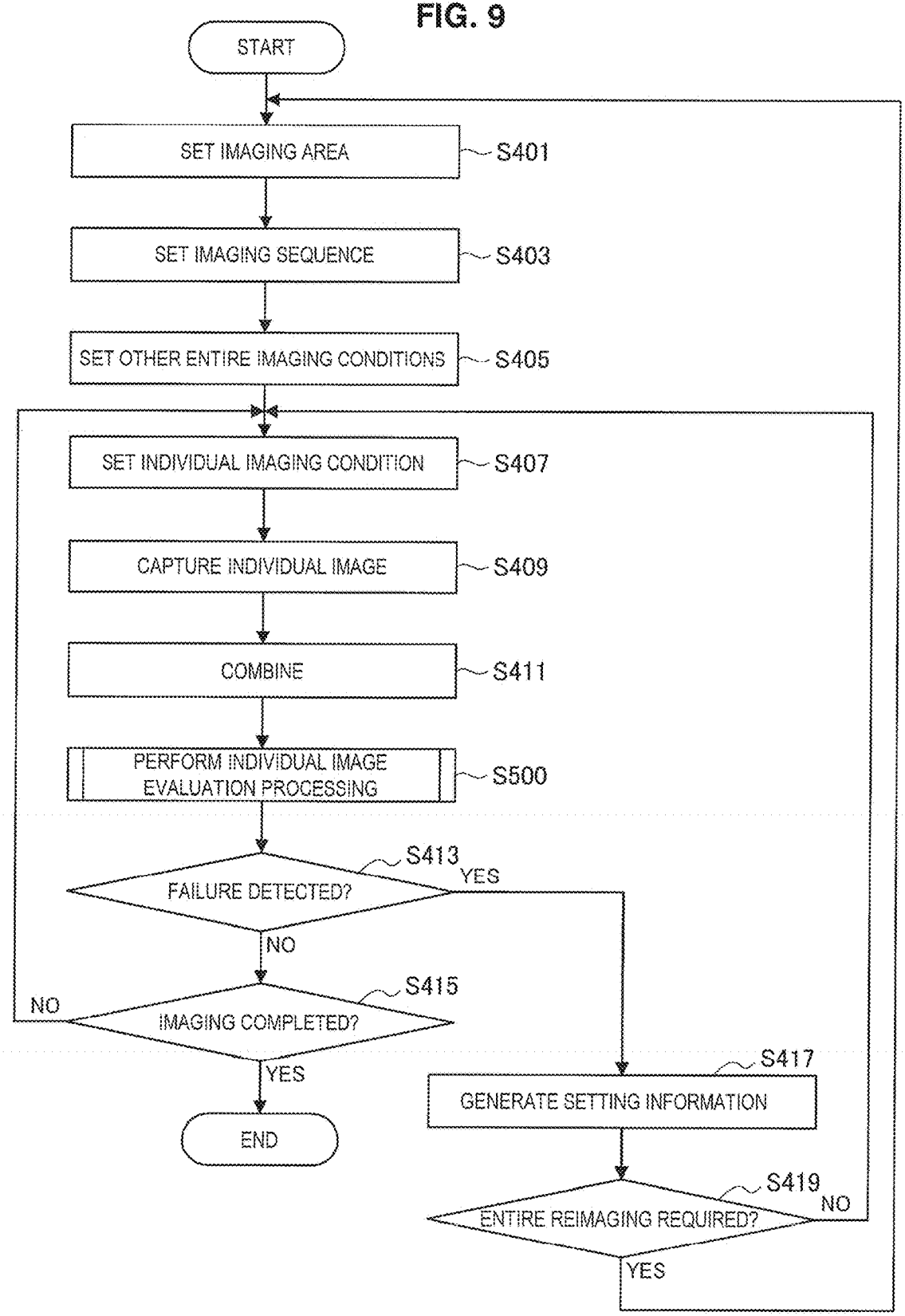
FIG. 9 is a flowchart illustrating an example of a schematic flow of imaging control processing according to a first embodiment.

FIG. 9 is a flowchart illustrating an example of a schematic flow of imaging control processing according to the first embodiment.

First, steps S401 to S405 are processes relating to entire imaging. In step S401, the imaging control unit 110 in the scanner 100-1 determines an imaging area, and sets the determined imaging area in the digital microscope 120. Next, in step S403, the imaging control unit 110 determines the imaging sequence of the individual images that show each individual area included in the set imaging area, and sets the determined imaging sequence in the digital microscope 120. Next, in step S405, the imaging control unit 110 determines the other entire imaging conditions, such as the white balance and the illumination brightness for example, and sets those determined imaging conditions in the digital microscope 120.

Next, steps S407 to S415 are processes that are repeated for each individual image.

In step S407, the imaging control unit 110 determines an individual imaging condition for capturing each individual image, such as the focus position, for example, and sets the determined imaging condition in the digital microscope 120. Next, in step S409, the digital microscope 120 captures an individual image based on the set imaging sequence. Then, in step S411, the combining unit 130 combines the captured individual image with an adjacent individual image. Further, in step S500, the failure detection unit 140 executes individual image evaluation processing relating to the captured individual image.

In step S413, the failure detection unit 140 determines whether a failure requiring reimaging was detected in the individual image evaluation processing. If a failure was detected, the processing proceeds to step S417. If a failure was not detected, the processing proceeds to step S415.

In step S415, the imaging control unit 110 determines whether imaging of the individual images has been completed for all of the individual areas included in the imaging area. If imaging has been completed, the processing finishes. If imaging has not been completed, the processing returns to step S407.

In step S417, the setting information generation unit 150 generates setting information for setting the imaging conditions for during reimaging. Then, in step S419, the imaging control unit 110 determines whether to perform partial reimaging or entire reimaging. If entire reimaging is desirable, the processing returns to step S401. If entire reimaging is not desirable, the processing returns to step S407. It is noted that if the processing returns to step S401, in steps S401 to 407, the imaging control unit 110 sets the entire imaging conditions and the individual imaging condition based on the generated setting information. Further, if the processing returns to step S407, in step S407, the imaging control unit 110 sets the individual imaging condition based on the generated setting information.

(Individual Image Evaluation Processing 500)

Next, an example of the individual image evaluation processing 500 will be described. The individual image evaluation processing 500 is executed for each type of failure requiring reimaging. Namely, if five types of failure are detected, five individual image evaluation processes 500 are executed. Here, individual image evaluation processing 500a relating to an imaging omission and individual image evaluation processing 500b relating to a combining failure in particular will be described.

Figure 10:
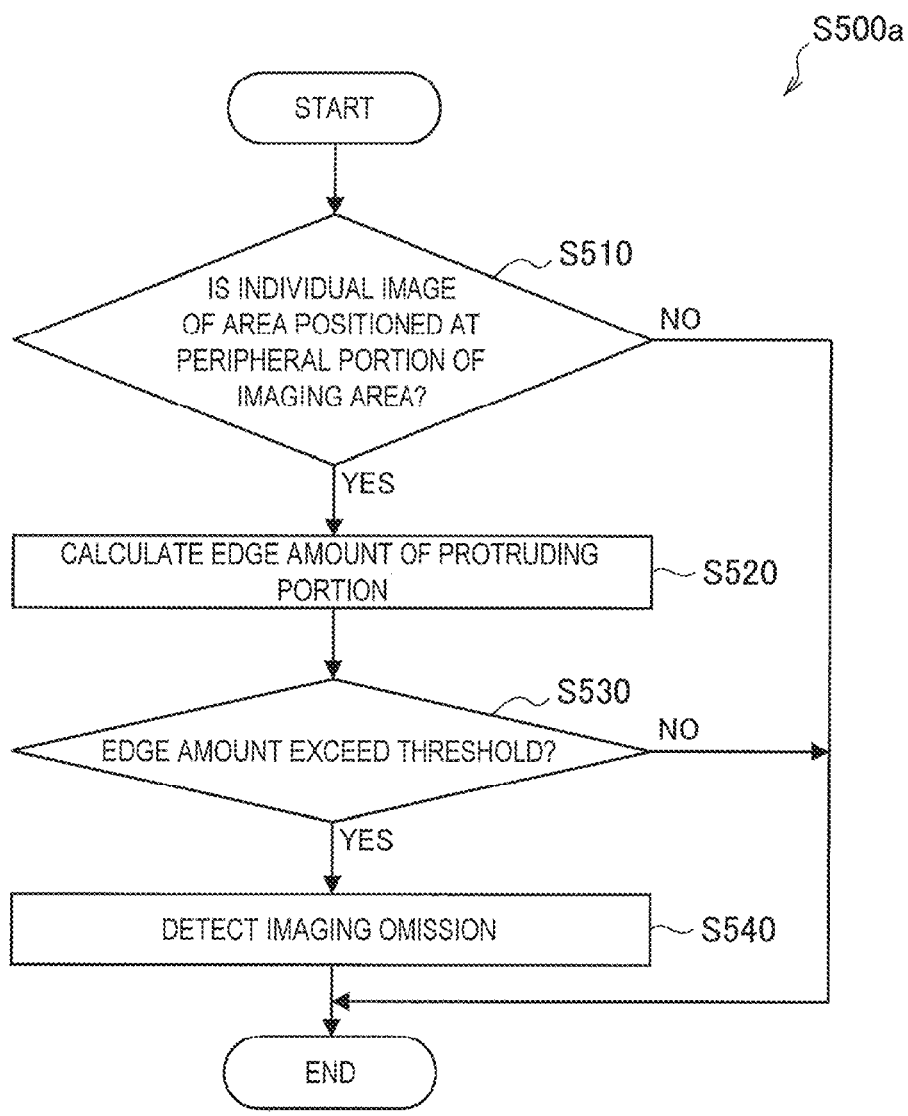
FIG. 10 is a flowchart illustrating an example of a flow of individual image evaluation processing relating to an imaging omission.

FIG. 10 is a flowchart illustrating an example of a flow of the individual image evaluation processing 500a relating to an imaging omission. In this individual image evaluation processing 500a, a direction in which texture is present in an individual image is evaluated.

First, in step S510, the failure detection unit 140 determines whether an individual image is an individual image of an area positioned at a peripheral portion of the imaging area 20 (i.e., an individual image forming the peripheral portion of the composite image). If this individual image is an individual image of an area positioned at a peripheral portion of the imaging area 20, the processing proceeds to step S520, and if not, the processing finishes.

In step S520, the failure detection unit 140 detects an edge of a protruding portion of the individual image (i.e., a portion of the individual image that protrudes from the composite image), and calculates the amount of the detected edge.

Then, in step S530, the failure detection unit 140 determines whether the calculated edge amount exceeds a threshold. Namely, the failure detection unit 140 determines whether texture is present in the protruding portion of the individual image. If the edge amount exceeds the threshold, the processing proceeds to step S540, and if not, the processing finishes.

In step S540, the failure detection unit 140 detects imaging omissions in the area that should be included in the composite image as a failure requiring reimaging. Then, the processing finishes.

Figure 11:
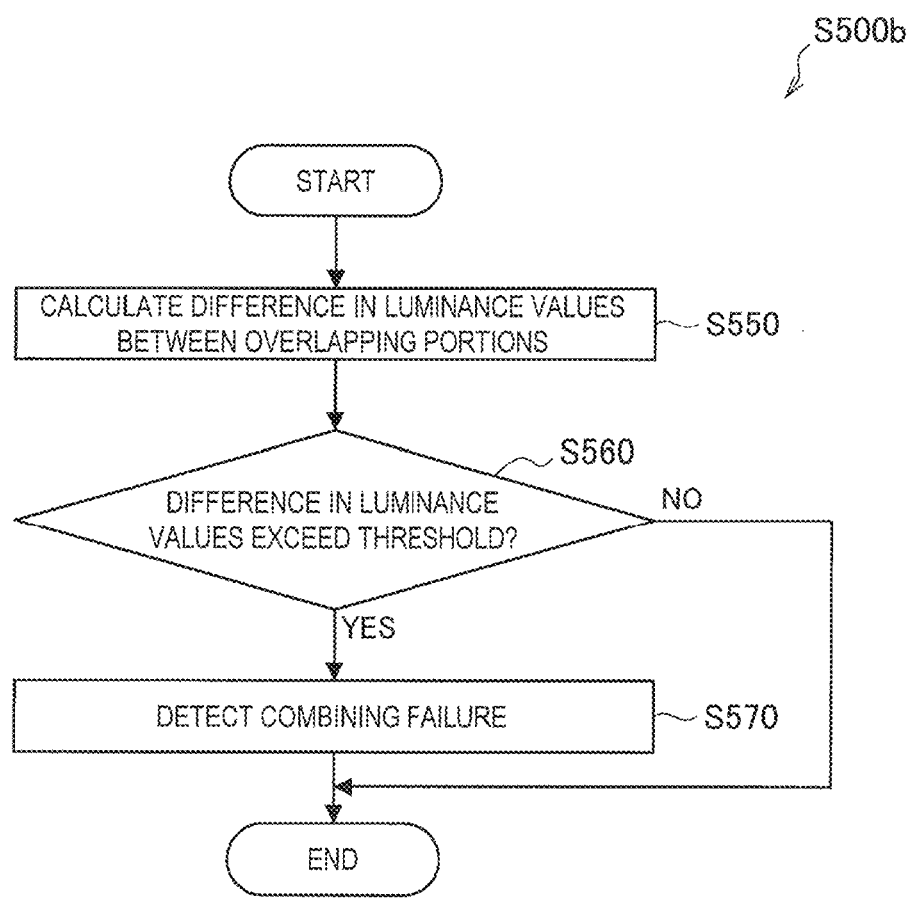
FIG. 11 is a flowchart illustrating an example of a flow of individual image evaluation processing relating to a combining failure.

Next, FIG. 11 is a flowchart illustrating an example of a flow of the individual image evaluation processing 500b relating to a combining failure. In this individual image evaluation processing 500b, a luminance value of an overlapping portion when the composite image is generated is evaluated.

First, in step S550, the failure detection unit 140 calculates the difference in luminance values between the overlapping portion of individual images that are adjacent to each other (i.e., the total value of the absolute values of the difference in luminance values between the pixels corresponding to the overlapping portion).

Then, in step S560, the failure detection unit 140 determines whether the difference in luminance values of the above-described overlapping portion exceeds a predetermined threshold. If this difference exceeds the predetermined threshold, the processing proceeds to step S570, and if not, the processing finishes.

In step S570, the failure detection unit 140 detects a combining failure when generating the composite image as a failure requiring reimaging. Then, the processing finishes.

In the above-described, a first embodiment was described. According to the first embodiment, in the scanner 100, a failure requiring reimaging is automatically detected, and imaging conditions for during reimaging are automatically set based on setting information generated based on the failure. Consequently, the user does not have to perform tasks, such as confirming the image on the screen and resetting imaging conditions and the like in order to avoid the failure from occurring again, as has been carried out in the past. Therefore, reimaging can be carried out with less effort and in less time. In addition, in the first embodiment, after a failure has been detected, reimaging can be immediately carried out. Namely, in order to carry out reimaging, it is not necessary to reinsert the sample into the digital microscope 120 or change the settings for items that do not need to be reset. Therefore, in this case, the work required to perform reimaging is almost eliminated, and the time taken for reimaging is substantially reduced.

3. Second Embodiment

Next, a second embodiment of the present disclosure will be described. According to the second embodiment of the present disclosure, in a server 200-2, a failure requiring reimaging is automatically detected. Further, based on the detection of this failure, the server 200-2 prompts a scanner 100-2 to recapture an image of the sample. It is noted that the configuration of the viewer 300 according to the second embodiment may be the same as the configuration of the viewer 300 according to the first embodiment.

<3.1 Scanner Configuration>

Figure 12:
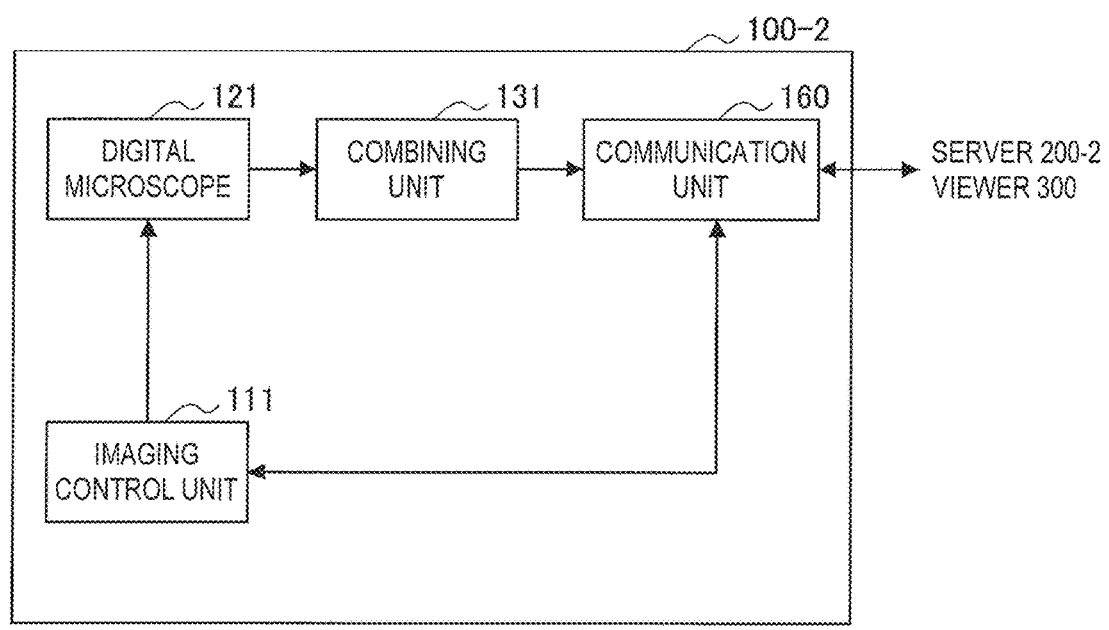
FIG. 12 is a block diagram illustrating an example of a configuration of a scanner according to a second embodiment.

First, an example of the configuration of a scanner 100-2 according to the second embodiment will be described with reference to FIG. 12. FIG. 12 is a block diagram illustrating an example of the configuration of the scanner 100-2 according to the second embodiment. As illustrated in FIG. 12, the scanner 100-2 includes an imaging control unit 111, a digital microscope 121, a combining unit 131, and a communication unit 160.

(Imaging Control Unit 111)

The imaging control unit 111 controls imaging that uses the digital microscope 121. For example, the imaging control unit 110 sets in the digital microscope 121 imaging conditions designated by the user or that are automatically determined, and makes the digital microscope 121 capture an image of the sample based on those imaging conditions. Similar to the imaging control unit 110 according to the first embodiment, as imaging conditions of the whole sample, the imaging control unit 111 sets, for example, an imaging area, an imaging sequence, illumination brightness, a white balance coefficient and the like. Further, as an imaging condition for each individual area, for example, the imaging control unit 111 sets a focus position.

Further, according to the present embodiment, when the setting information generated by the server 200-2 has been received by the communication unit 160, the imaging control unit 111 resets at least some of the above-described imaging conditions in the digital microscope 121. Then, the imaging control unit 111 makes the digital microscope 121 recapture an image of the sample based on the reset imaging conditions.

The imaging control unit 110 outputs imaging conditions information indicating the set or reset imaging conditions to the communication unit 160.

(Digital Microscope 121)

The digital microscope 121 captures an image based on the imaging conditions set by the imaging control unit 111. For example, similar to the digital microscope 120 according to the first embodiment, the digital microscope 121 captures individual images showing each individual area in the set imaging area. Further, the digital microscope 121 outputs the captured individual images to the combining unit 131.

(Combining Unit 131)

Similar to the combining unit 130 according to the first embodiment, the combining unit 131 generates a composite image by combining the individual images captured by the digital microscope 121. Further, the combining unit 131 outputs the generated composite image to the communication unit 160.

<3.2 Server Configuration>

Figure 13:
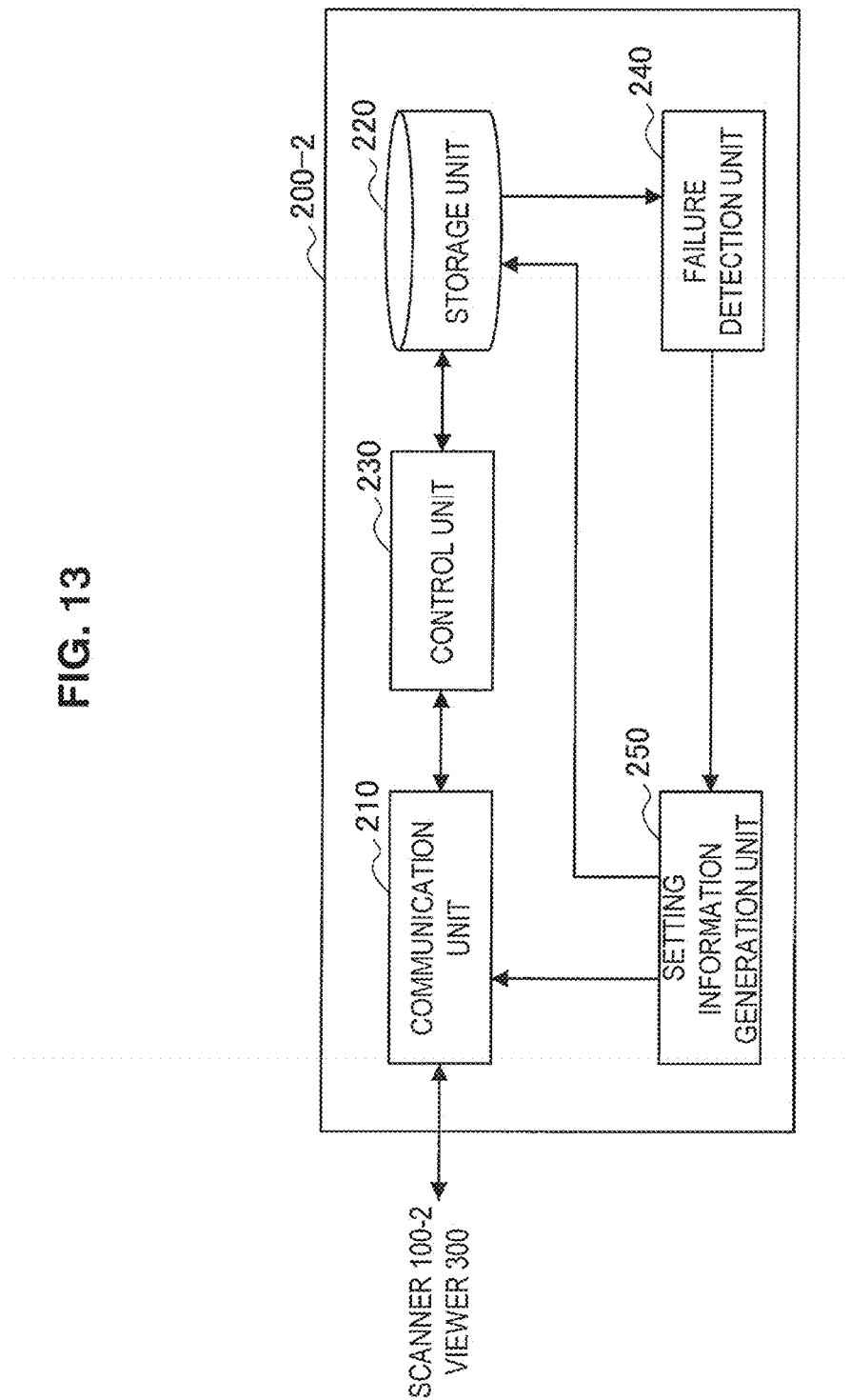
FIG. 13 is a block diagram illustrating an example of a configuration of a server according to a second embodiment.

Next, an example of the configuration of the server 200-2 according to the second embodiment will be described with reference to FIG. 13. FIG. 13 is a block diagram illustrating an example of the configuration of the server 200-2 according to the second embodiment. As illustrated in FIG. 13, the server 200-2 includes a communication unit 210, a storage unit 220, a control unit 230, a failure detection unit 240, and a setting information generation unit 250.

(Failure Detection Unit 240)

The failure detection unit 240 detects a failure requiring reimaging by evaluating a composite image (or a partial image thereof) received from the scanner 100-2 via the communication unit 210. The types of failure detected by the failure detection unit 240 may be the same as the types of failure that are detected by the failure detection unit 140 of the scanner 100-1 according to the first embodiment. Namely, the failure detection unit 240 can detect the above-described imaging omission and combining failure as failures relating to a composite image. Further, as other failures, the failure detection unit 240 can detect the above-described flaw in focus position, flaw in white balance, and flaw in brightness.

It is noted that when detecting an imaging omission, since a protruding portion is not included in the composite image, the failure detection unit 240 uses the peripheral portion 35 illustrated in FIG. 5B in the evaluation of the direction in which texture is present in the composite image or partial image. Further, when detecting a combining failure, since the two overlapping portions of the individual images that are adjacent to each other have already been lost, the failure detection unit 240 evaluates the direction of edges included in the composite image as illustrated in FIG. 6.

The failure detection unit 240 outputs information relating to the detected failure to the setting information generation unit 250.

(Setting Information Generation Unit 250)

When a failure is detected by the failure detection unit 240, the setting information generation unit 250 generates setting information for setting the imaging conditions for during reimaging. Similar to the setting information generation unit 150, the setting information generation unit 250 generates various types of setting information when a failure requiring reimaging is detected, such as an imaging omission, a combining failure, a flaw in the focus position, a flaw in the white balance, and a flaw in the brightness.

When the setting information has been generated, the setting information generation unit 250 transmits to the scanner 100-2 the setting information and a reimaging request prompting reimaging via the communication unit 210. The reimaging request may also be transmitted to the scanner 100-2 after the reimaging request has been transmitted to the viewer 300 and a reimaging instruction from the user input on the viewer 300.

<3.3 Processing Flow>

Next, an example of the imaging control processing according to the second embodiment will be described with reference to FIGS. 14 to 17.

(Imaging Control Processing on the Server 200-2 Side)

Figure 14:
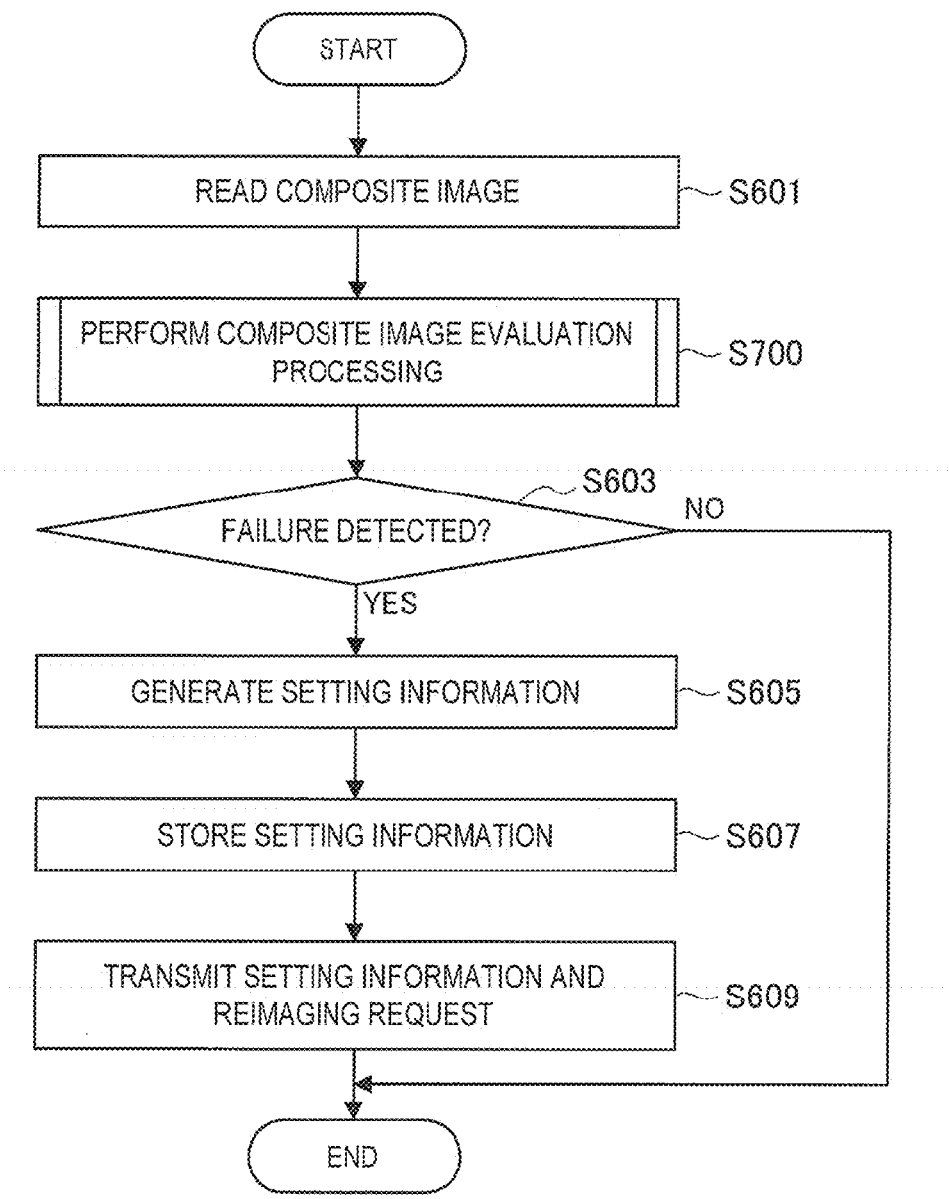
FIG. 14 is a flowchart illustrating an example of a schematic flow of imaging control processing on a server side according to a second embodiment.

First, of the imaging control processing, an example of the processing performed on the server 200-2 side will be described. FIG. 14 is a flowchart illustrating an example of a schematic flow of imaging control processing on the server 200-2 side according to the second embodiment.

First, in step S601, the failure detection unit 240 of the server 200-2 reads a composite image from the storage unit 220. For example, the failure detection unit 240 selects and reads a composite image from the storage unit 220 by automatically selecting an unevaluated composite image or based on an instruction from the user. Next, in step S700, the failure detection unit 240 executes composite image evaluation processing. Then, in step S603, the failure detection unit 240 determines whether a failure requiring reimaging has been detected. If such a failure has been detected, the processing proceeds to step S605, and if not, the processing finishes.

In step S605, the setting information generation unit 250 generates setting information for setting the imaging conditions for during reimaging. Next, in step S607, the setting information generation unit 250 stores the generated setting information in the storage unit 220. Further, in step 609, the setting information generation unit 250 transmits the setting information and a reimaging request to the scanner 100-2 or the viewer 300 via the communication unit 210. Then, the processing finishes.

(Composite Image Evaluation Processing 700)

Next, an example of the composite image evaluation processing 700 will be described. The composite image evaluation processing 700 is executed for each type of failure requiring reimaging. Namely, if five types of failure are detected, five composite image evaluation processes 700 are executed. Here, composite image evaluation processing 700a relating to an imaging omission and composite image evaluation processing 700b relating to a combining failure in particular will be described.

Figure 15:
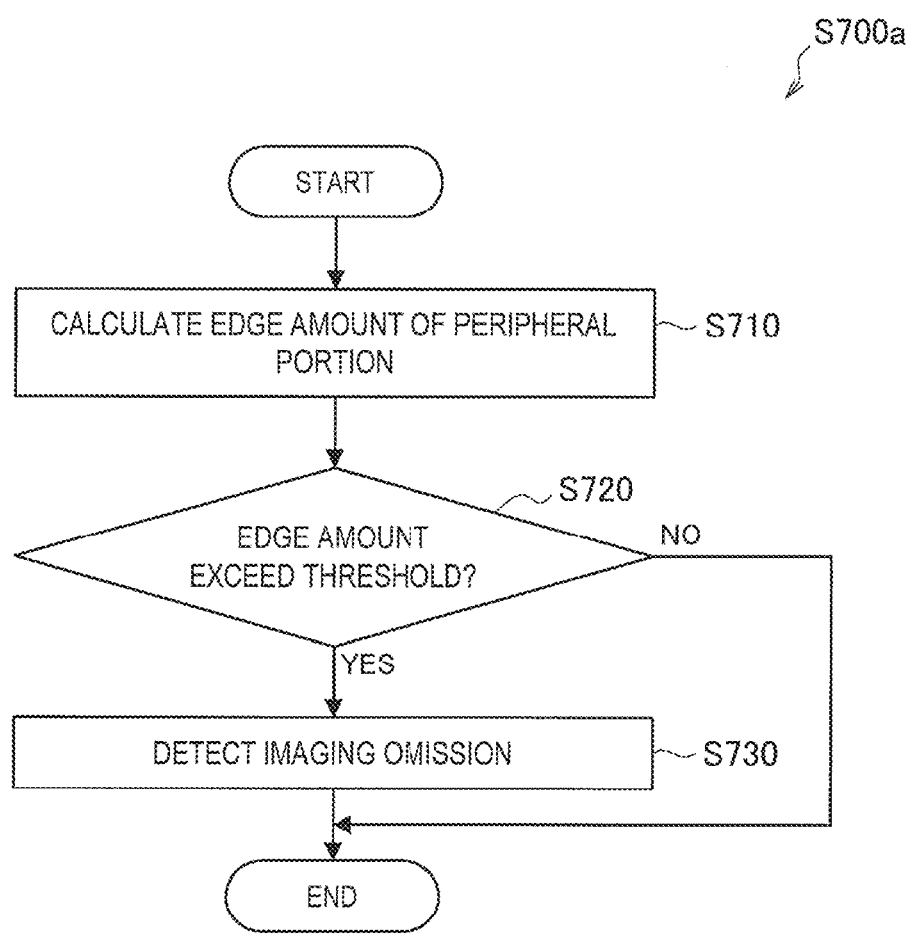
FIG. 15 is a flowchart illustrating an example of a flow of composite image evaluation processing relating to an imaging omission.

FIG. 15 is a flowchart illustrating an example of a flow of the composite image evaluation processing 700a relating to an imaging omission. In this composite image evaluation processing 700a, a direction in which texture is present in a composite image is evaluated.

First, in step S710, the failure detection unit 240 detects an edge of a peripheral portion of a composite image, and calculates an amount of the detected edge. The failure detection unit 240 calculates the edge amount for each individual image (i.e., partial image) forming the composite image.

Then, in step S720, the failure detection unit 240 determines whether the calculated edge amount exceeds a threshold. Namely, the failure detection unit 240 determines whether texture is present in a peripheral portion of the composite image. The failure detection unit 240 performs a determination for each individual image (i.e., partial image) forming the composite image. If the edge amount exceeds the threshold, the processing proceeds to step S730, and if not, the processing finishes.

In step S730, the failure detection unit 240 detects imaging omissions in the area that should be included in the composite image as a failure requiring reimaging. Then, the processing finishes.

Figure 16:
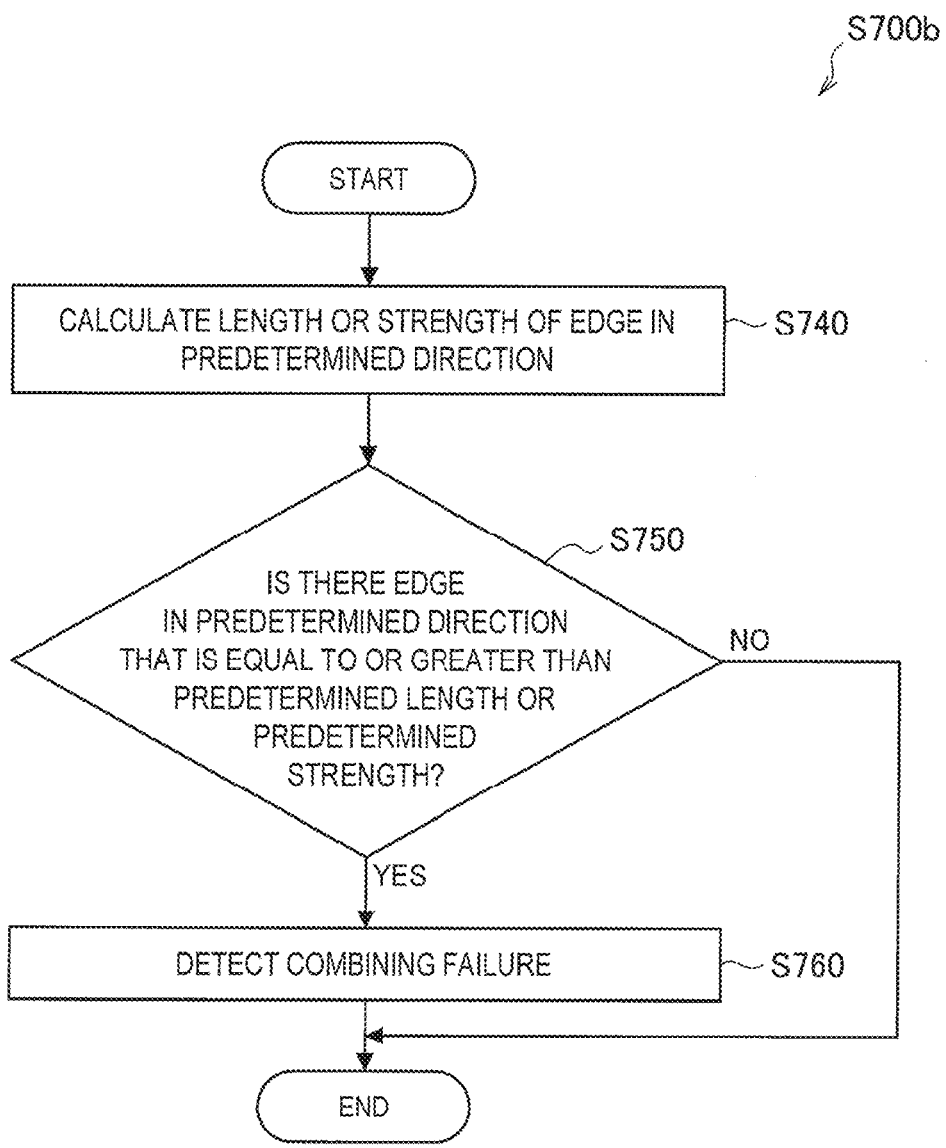
FIG. 16 is a flowchart illustrating an example of a flow of composite image evaluation processing relating to a combining failure.

Next, FIG. 16 is a flowchart illustrating an example of a flow of the composite image evaluation processing 700b relating to a combining failure. In this composite image evaluation processing 700a, an edge in a predetermined direction is evaluated.

First, In step S740, the failure detection unit 240 detects an edge in a predetermined direction that is included in the composite image, and calculates the length or strength of the detected edge.

Then, in step S750, the failure detection unit 240 determines if there is an edge in the predetermined direction that is equal to or greater than a predetermined length or a predetermined strength. If there is an edge in the predetermined direction that is equal to or greater than the predetermined length or the predetermined strength, the processing proceeds to step S760, and if not, the processing finishes.

In step S760, the failure detection unit 240 detects a combining failure when generating the composite image as a failure requiring reimaging. Then, the processing finishes.

(Imaging Control Processing on the Scanner 100-2 Side)

Figure 17:
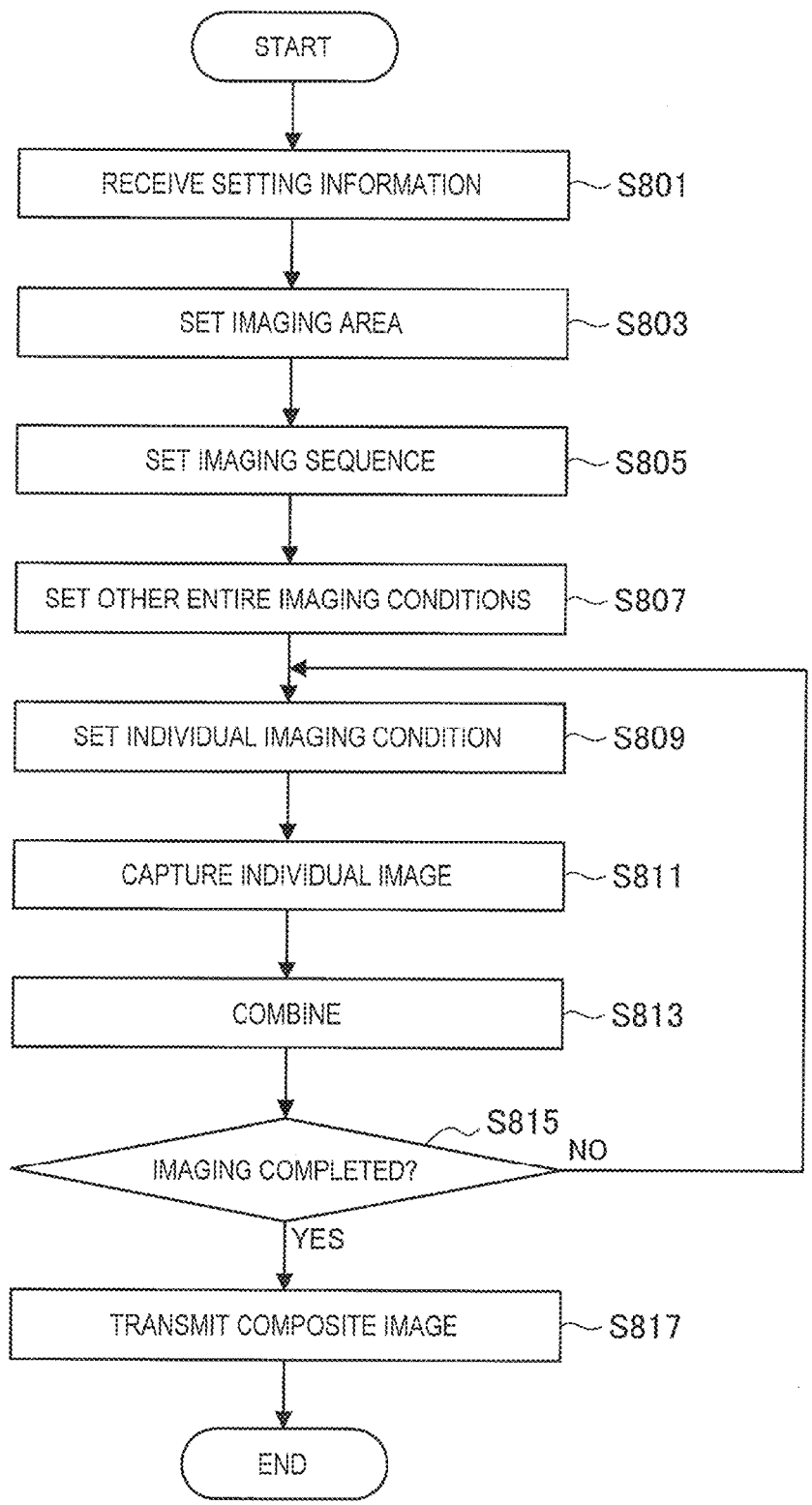
FIG. 17 is a flowchart illustrating an example of a schematic flow of imaging control processing on a scanner side according to a second embodiment.

Next, of the imaging control processing, an example of the processing performed on the scanner 100-2 side will be described. FIG. 17 is a flowchart illustrating an example of a schematic flow of imaging control processing on the scanner 100-2 side according to the second embodiment.

First, steps S801 to S807 are processes relating to entire imaging. In step S801, the communication unit 160 of the scanner 100-2 receives setting information from the server 200-2. Next, in step S803, based on the setting information, the imaging control unit 111 determines the imaging sequence of the individual images showing each of the individual areas included in the set imaging area, and sets the determined imaging sequence in the digital microscope 121. Further, in step S807, based on the setting information, the imaging control unit 111 determines the other entire imaging conditions, such as the while balance and the illumination brightness for example, and sets the determined imaging conditions in the communication circuit 121.

Next, steps S809 to S815 are processes that are repeated for each individual image.

In step S809, the imaging control unit 111 determines an individual imaging condition for capturing each individual image, such as the focus position, for example, and sets the determined imaging condition in the digital microscope 121. Next, in step S811, the digital microscope 121 captures an individual image based on the set imaging sequence. Then, in step S813, the combining unit 131 combines the captured individual image with an adjacent individual image.

In step S815, the imaging control unit 111 determines whether imaging of the individual images has been completed for all of the individual areas included in the imaging area. If imaging has been completed, the processing proceeds to step S817. If imaging has not been completed, the processing returns to step S809.

In step S817, the communication unit 160 transmits the composite image to the server 200-2 and the viewer 300. Then, the processing finishes.

In the above-described, a second embodiment was described. According to the second embodiment, in the scanner 200, a failure requiring reimaging is automatically detected, and the scanner 100-2 is prompted to execute reimaging based on that failure. Consequently, the user does not have to perform tasks, such as confirming the image on the screen and resetting imaging conditions and the like in order to avoid the failure from occurring again, as has been carried out in the past. Therefore, reimaging can be carried out with less effort and in less time. In addition, in the second embodiment, failure detection and setting information generation can be performed by storing a composite image in the server even without having failure detection and setting information generation functions in each scanner. Further, failure detection and setting information generation can be performed as necessary ex-post facto while reducing the imaging time at a scanner.

SUMMARY

In the above, two embodiments of the digital microscope system according to the present disclosure were described with reference to FIGS. 1 to 17. According to these embodiments of the present disclosure, a failure requiring reimaging is detected by evaluating an image captured using a digital microscope. Further, when such a failure is detected, setting information for setting imaging conditions for during reimaging is generated. Namely, a failure requiring reimaging is automatically detected, and imaging conditions for during reimaging are automatically set based on setting information generated based on the failure. Consequently, the user does not have to perform tasks, such as confirming the image on the screen and resetting imaging conditions and the like in order to avoid the failure from occurring again, as has been carried out in the past. Therefore, reimaging can be carried out with less effort and in less time.

Further, a failure relating to a composite image is detected as a failure requiring reimaging. Based on the detection of such a failure, reimaging is automatically performed even if a failure peculiar to a digital microscope system occurs, such as an imaging omission and a combining failure. Consequently, the time and effort for reimaging in a digital microscope system can be reduced.

Still further, if an imaging omission is detected, imaging area information is generated as setting information. Based on this imaging area information, an imaging area can be set so as to include the area of the imaging omission. This enables the same imaging omission to be avoided during reimaging. In addition, imaging sequence information is generated as setting information with this imaging area information. Based on this imaging sequence information, a combining failure can be avoided during reimaging.

Moreover, if a combining failure is detected, imaging sequence information is generated as setting information. Based on this imaging sequence information, the likelihood of a combining failure occurring can be reduced by performing reimaging in a different imaging sequence.

Further, during reimaging, a determination is made whether to perform either partial reimaging or entire reimaging based on the type of detected failure. Thus, reimaging can be performed for the necessary range by determining the reimaging range based on the type of failure. Namely, reimaging can be performed more efficiently while avoiding another failure in the reimaging.

Still further, failure detection and setting information generation may be performed on the scanner side, for example. In this case, for example, every time the plurality of individual images are captured, each image is evaluated in order to detect a failure requiring reimaging. Since such an evaluation enables a failure to be detected after image capturing, reimaging can be performed immediately. Consequently, since reimaging can be performed without rearranging the imaging target, such as a prepared slide, every time, the time and effort taken for the reimaging can be reduced.

In addition, failure detection and setting information generation may be performed on the server side, for example. In this case, for example, failure detection and setting information generation are performed using a composite image that has accumulated in the server. Consequently, failure detection and setting information generation can be performed by storing a composite image in this server even without having failure detection and setting information generation functions in each scanner. Further, failure detection and setting information generation can be performed as necessary ex-post facto while reducing the imaging time at a scanner.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the digital microscope may be configured without a scanner, or may be a separate apparatus from the scanner. In this case, the digital microscope is connected to the scanner. Further, two or more apparatuses from among the scanner, the server, and the viewer may be the same apparatus.

Further, the processing steps in the imaging control processing according to the present specification do not have to be executed in the temporal order described in the flowcharts. For example, the processing steps in the imaging control processing may be carried out in an order different to that described in the flowcharts, or may be carried out in parallel.

In addition, a computer program can be written that makes a CPU, ROM, RAM and the like included in a scanner, server, and viewer exhibit the same functions as the respective parts in the above-described scanner, server, and viewer. Moreover, a storage medium in which such a computer program is stored is also provided.

Additionally, the present technology may also be configured as below.

(1)
An information processing apparatus including:
a detection unit configured to detect a failure requiring reimaging relating to an image captured using a digital microscope by evaluating the image; and
a generation unit configured to, if the failure was detected by the detection unit, generate setting information for setting an imaging condition for during reimaging.

(2)
The information processing apparatus according to (1), wherein the detection unit is configured to detect as the failure a failure relating to a composite image generated by combining a plurality of images.

(3)
The information processing apparatus according to (2), wherein the failure relating to the composite image includes an imaging omission of an area that should be included in the composite image.

(4)
The information processing apparatus according to (3), wherein the detection unit is configured to detect the imaging omission by evaluating a direction in which texture is present in the image.

(5)
The information processing apparatus according to any one of (2) to (4), wherein the generation unit is configured to, if the imaging omission was detected by the detection unit, generate imaging area information for resetting an imaging area so as to include an additional area to be newly captured.

(6)
The information processing apparatus according to (5), wherein the generation unit is configured to, if the imaging area is to be reset, further generate imaging sequence information for resetting an imaging sequence of the image.

(7)
The information processing apparatus according to (2), wherein the failure relating to the composite image includes a combining failure when generating the composite image.

(8)
The information processing apparatus according to (7), wherein the detection unit is configured to detect the combining failure by evaluating an edge in a predetermined direction included in the composite image.

(9)
The information processing apparatus according to (7), wherein the detection unit is configured to detect the combining failure by evaluating a luminance value of an overlapping portion when the composite image is generated.

(10)
The information processing apparatus according to any one of (7) to (9), wherein the generation unit is configured to, if the combining failure was detected by the detection unit, generate imaging sequence information for resetting an imaging sequence of the image.

(11)
The information processing apparatus according to any one of (2) to (10), wherein the detection unit is configured to further detect as the failure a flaw in focus position, white balance, or brightness.

(12)
The information processing apparatus according to any one of (2) to (11), further including:
an imaging control unit configured to determine whether to make the digital microscope recapture each image or recapture an entirety of a plurality of images based on a type of the failure detected by the detection unit.

(13)
The information processing apparatus according to any one of (2) to (12), wherein the detection unit is configured to evaluate each image for detection of the failure every time each of the plurality of images is captured.

(14)
The information processing apparatus according to any one of (2) to (12), wherein the detection unit is configured to evaluate the composite image or a partial image of the composite image after the composite image has been generated.

(15)
The information processing apparatus according to any one of (1) to (14), further including:
a display control unit configured to enable the setting information generated by the generation unit to be presented to the user or edited by the user before reimaging is executed.

(16)
An imaging control method including:
detecting a failure requiring reimaging relating to an image captured using a digital microscope by evaluating the image; and
if the failure was detected by the detection unit, generating setting information for setting an imaging condition for during reimaging.

(17)
A program that causes a computer to function as:
a detection unit configured to detect a failure requiring reimaging relating to an image captured using a digital microscope by evaluating the image; and a generation unit configured to, if the failure was detected by the detection unit, generate setting information for setting an imaging condition for during reimaging.

(18) A digital microscope system including:
a digital microscope; and
an information processing apparatus including
a detection unit configured to detect a failure requiring reimaging relating to an image captured using the digital microscope by evaluating the image, and
a generation unit configured to, if the failure is detected by the detection unit, generate setting information for setting an imaging condition for during reimaging.

(19) A display control apparatus including: an acquisition unit configured to acquire setting information for setting an imaging condition for during reimaging that is generated when a failure requiring reimaging relating to an image captured using a digital microscope is generated by evaluating the image; and
a display control unit configured to display the setting information acquired by the acquisition unit on a display face.

(20) An information processing apparatus including:
a detection unit configured to detect a failure relating to a composite image generated by combining a plurality of images captured using a digital microscope by evaluating an image; and
a generation unit configured to, if the failure is detected by the detection unit, generate setting information for setting an imaging condition for during reimaging.

REFERENCE SIGNS LIST 1 digital microscope system
10 biological sample
20 imaging area
21 individual area
30 individual image
33 overlapping portion
35 peripheral portion
37 protruding portion
40 composite image
100 scanner
110, 111 imaging control unit
120, 121 digital microscope
130, 131 combining unit
140 failure detection unit
150 setting information generation unit
160 communication unit
200 server
210 communication unit
220 storage unit
230 control unit
240 failure detection unit
250 setting information generation unit
300 viewer
310 communication unit
320 input unit
330 control unit
331 acquisition unit
333 display control unit
340 display unit

The invention claimed is:

1. An information processing apparatus comprising:
a processing device including a computer and a memory containing instructions for performing a process including:
detecting a failure requiring reimaging relating to an image captured using a digital microscope by evaluating the image;
generating, if the failure was detected, setting information for setting an imaging condition for reimaging, wherein the processing device determines whether the failure requiring reimaging has been detected and, in response to determining that the failure requiring reimaging has been detected, generates the setting information for setting the imaging condition for automatic reimaging, wherein the image is captured by the digital microscope using imaging conditions including an original imaging sequence for capturing individual images of different areas within an imaging area to be captured and wherein generating setting information for reimaging includes resetting the imaging conditions from the original imaging sequence to a newly set imaging sequence for capturing individual images of different areas within the imaging area to provide reset imaging conditions, wherein the newly set imaging sequence is different from the original imaging sequence that was used when the failure was detected; and
controlling the digital microscope to perform reimaging in response to the reset imaging conditions, wherein detecting a failure requiring reimaging includes detecting an edge, in a predetermined direction, in a composite image generated by combining a plurality of images, calculating a length of the edge in the predetermined direction, and determining a combining failure when the calculated length exceeds a predetermined length.

2. The information processing apparatus according to claim 1, wherein the processing device is configured to detect imaging omission by evaluating a direction in which texture is present in the image.

3. The information processing apparatus according to claim 1, wherein the processing device is configured to, if imaging omission was detected, generate imaging area information for resetting an imaging area so as to include an additional area to be newly captured.

4. The information processing apparatus according to claim 1, further comprising:
the processing device determining whether to make the digital microscope recapture each image or recapture an entirety of a plurality of images based on a type of the failure detected.

5. The information processing apparatus according to claim 1, wherein the processing device is configured to evaluate each image for detection of the failure.

6. The information processing apparatus according to claim 1, wherein the processing device is configured to evaluate a composite image or a partial image of the composite image after the composite image has been generated.

7. The information processing apparatus according to claim 1, further comprising:
a display control unit configured to enable the setting information to be presented to the user or edited by the user before reimaging is executed.

8. An imaging control method comprising:
detecting, by a processing device, a failure requiring reimaging relating to an image captured using a digital microscope by evaluating the image;

if the failure was detected, generating, by the processing device, setting information for setting an imaging condition for reimaging, wherein the processing device determines whether the failure requiring reimaging has been detected and, in response to determining that the failure requiring reimaging has been detected, generates the setting information for setting the imaging condition for automatic reimaging, wherein the image is captured by the digital microscope using imaging conditions including an original imaging sequence for capturing individual images of different areas within an imaging area to be captured and wherein generating setting information for reimaging includes resetting the imaging conditions from the original imaging sequence to a newly set imaging sequence for capturing individual images of different areas within the imaging area to provide reset imaging conditions, wherein the newly set imaging sequence is different from the original imaging sequence that was used when the failure was detected; and controlling the digital microscope to perform reimaging in response to the reset imaging conditions, wherein detecting a failure requiring reimaging includes detecting an edge, in a predetermined direction, in a composite image generated by combining a plurality of images, calculating a length of the edge in the predetermined direction, and determining a combining failure when the calculated length exceeds a predetermined length.

9. A computer-readable storage device encoded with computer-executable instructions that, when executed by a computer, cause the computer to:

detect a failure requiring reimaging relating to an image captured using a digital microscope by evaluating the image;

if the failure was detected, generate setting information for setting an imaging condition for reimaging, wherein the computer determines whether the failure requiring reimaging has been detected and, in response to determining that the failure requiring reimaging has been detected, generates the setting information for setting the imaging condition for automatic reimaging, wherein the image is captured by the digital microscope using imaging conditions including an original imaging sequence for capturing individual images of different areas within an imaging area to be captured and wherein generating setting information for reimaging includes resetting the imaging conditions from the original imaging sequence to a newly set imaging sequence for capturing individual images of different areas within the imaging area to provide reset imaging conditions, wherein the newly set imaging sequence is different from the original imaging sequence that was used when the failure was detected; and control the digital microscope to perform reimaging in response to the reset imaging conditions, wherein detecting a failure requiring reimaging includes detecting an edge, in a predetermined direction, in a composite image generated by combining a plurality of images, calculating a length of the edge in the predetermined direction, and determining a combining failure when the calculated length exceeds a predetermined length.

10. A digital microscope system comprising:
a digital microscope; and
an information processing apparatus including
a processing device including a computer and a memory containing instructions for performing a process including:

detecting a failure requiring reimaging relating to an image captured using the digital microscope by evaluating the image, generating, if the failure is detected, setting information for setting an imaging condition for reimaging, wherein the processing device determines whether the failure requiring reimaging has been detected and, in response to determining that the failure requiring reimaging has been detected, generates the setting information for setting the imaging condition for automatic reimaging, wherein the image is captured by the digital microscope using imaging conditions including an original imaging sequence for capturing individual images of different areas within an imaging area to be captured and wherein generating setting information for reimaging includes resetting the imaging conditions from the original imaging sequence to a newly set imaging sequence for capturing individual images of different areas within the imaging area to provide reset imaging conditions, wherein the newly set imaging sequence is different from the original imaging sequence that was used when the failure was detected; and controlling the digital microscope to perform reimaging in response to the reset imaging conditions, wherein detecting a failure requiring reimaging includes detecting an edge, in a predetermined direction, in a composite image generated by combining a plurality of images, calculating a length of the edge in the predetermined direction, and determining a combining failure when the calculated length exceeds a predetermined length.

11. The information processing apparatus according to claim 1, wherein the processing device is configured to detect as the failure a failure relating to a composite image generated by combining a plurality of images and wherein the failure relating to the composite image includes an imaging omission of an area that should be included in the composite image.

12. The imaging control method according to claim 8, wherein detecting the failure includes detecting as the failure a failure relating to a composite image generated by combining a plurality of images and wherein the failure relating to the composite image includes an imaging omission of an area that should be included in the composite image.

13. The computer-readable storage device according to claim 9, wherein detecting the failure includes detecting as the failure a failure relating to a composite image generated by combining a plurality of images and wherein the failure relating to the composite image includes an imaging omission of an area that should be included in the composite image.

14. The digital microscope system according to claim 10, wherein the processing device is configured to detect as the failure a failure relating to a composite image generated by combining a plurality of images and wherein the failure relating to the composite image includes an imaging omission of an area that should be included in the composite image.

* * * * *